(12) United States Patent
Sawada et al.

(10) Patent No.: US 7,315,464 B2
(45) Date of Patent: Jan. 1, 2008

(54) DRIVE SYSTEM AND AC CONVERSION DEVICE

(75) Inventors: Shinichi Sawada, Niitsu (JP); Takeaki Ogawa, Toyosaka (JP); Naoki Tanaka, Shirone (JP)

(73) Assignees: Sharp Kabushiki Kaisha, Osaka (JP); Sharp Niigata Electronics Corporation, Niigata (JP)

( * ) Notice: Subject to any disclaimer, the term of this patent is extended or adjusted under 35 U.S.C. 154(b) by 321 days.

(21) Appl. No.: 10/953,490

(22) Filed: Sep. 30, 2004

(65) Prior Publication Data

US 2005/0105305 A1  May 19, 2005

(30) Foreign Application Priority Data

Oct. 3, 2003 (JP) .......................... P2003-346014
Jun. 22, 2004 (JP) .......................... P2004-183809

(51) Int. Cl.
*H02M 5/25* (2006.01)
*G05F 1/00* (2006.01)

(52) U.S. Cl. ...................... 363/159; 315/307

(58) Field of Classification Search .............. 363/34, 363/37, 156, 159, 163, 165; 315/246, 250, 315/307, 308
See application file for complete search history.

(56) References Cited

U.S. PATENT DOCUMENTS 6,072,283 A * 6/2000 Hedrei et al. ............... 315/307
6,515,878 B1 * 2/2003 Meins et al. ................ 363/37
6,600,273 B2 * 7/2003 Kim et al. ................. 315/247

FOREIGN PATENT DOCUMENTS

| JP | A 56-88678 | 7/1981 |
|---|---|---|
| JP | B2 58-40915 | 9/1983 |
| JP | A 5-137326 | 6/1993 |
| JP | A 6-197555 | 7/1994 |
| JP | A 9-330796 | 12/1997 |
| JP | A 9-331680 | 12/1997 |
| JP | A 2000-12256 | 1/2000 |
| JP | A 2004-135415 | 4/2004 |

* cited by examiner

*Primary Examiner*—Adolf Berhane
(74) *Attorney, Agent, or Firm*—Nixon & Vanderhye P.C.

(57) ABSTRACT

A drive system with small power loss in power conversion is provided. The drive system has an AC conversion device for converting commercial AC power from a commercial AC power supply and a DC conversion device. An AC power supply path for supplying power to discharge tubes, and a DC power supply path for supplying power to an image processing circuit or the like, are provided independently. The AC conversion device converts commercial AC power into converted AC power and gives the converted AC power to an AC drive device directly. Consequently, it is possible to reduce conversion steps for generating converted AC power and to reduce power loss that occurs in a conversion process. In particular, when power consumption of the discharge tubes is large, it is possible to reduce power loss in an entire liquid crystal display apparatus effectively by providing the AC conversion device.

15 Claims, 20 Drawing Sheets

DRIVE SYSTEM AND AC CONVERSION DEVICE

BACKGROUND OF THE INVENTION

1. Field of the Invention

The present invention relates to a drive system that has a DC drive device, which is driven by DC power, and an AC drive device, which is driven by AC power, and is given AC power. For example, the invention relates to a liquid crystal display apparatus.

2. Description of the Related Art

FIG. 21 is a sectional view showing a conventional liquid crystal display apparatus 1. The liquid crystal display apparatus 1 performs image display by transmitting backlight 17 to a liquid crystal display substrate 16 selectively. The liquid crystal display apparatus 1 includes a housing 19, discharge tubes 5 that emit the backlight 17, and an electric circuit group 18 for supplying power to the discharge tube 5.

FIG. 22 is a block diagram showing the conventional liquid crystal display apparatus 1. The liquid crystal display apparatus 1 is connected to a commercial power supply 2 and is driven by AC power given from the commercial power supply 2. The liquid crystal display apparatus 1 has a DC conversion device 3, an inverter device 4, the discharge tubes 5, an image processing circuit 6, a liquid crystal driver 7, and a speaker 8.

The DC conversion device 3 converts commercial AC power given from the commercial power supply into DC power. The DC conversion device 3 gives the converted DC power to the inverter device 4, the image processing circuit 6, the liquid crystal driver 7, and the speaker 8. The inverter device 4 converts the DC power given from the DC conversion device 3 into AC power having a frequency and a voltage capable of driving the discharge tubes 5. Then, the inverter device 4 gives the converted AC power to the discharge tubes 5. In addition, the image processing circuit 6, the liquid crystal driver 7, and the speaker 8 are driven by the DC power given from the DC conversion device 3.

FIG. 23 is a block diagram showing the conventional DC conversion device 3 and the conventional inverter device 4. The DC conversion device 3 has a first DC power generating circuit 10, a first alternating power generating circuit 11, a first transforming circuit 12, and a second DC power generating circuit 13. The DC conversion device 3 converts commercial AC power into DC power with the first DC power generating circuit 10. The DC conversion device 3 converts the converted DC power into high-frequency AC power with the first alternating power generating circuit 11. Then, the DC conversion device 3 transforms the high-frequency AC power into AC power of a target voltage with the first transforming circuit 12 and converts the transformed AC power into DC power with the second DC power generating circuit 13. In this way, the DC conversion device 3 generates DC power of a target voltage and gives the generated DC power to the inverter device 4, the image processing circuit 6, the liquid crystal driver 7, and the speaker 8.

The inverter device 4 has a second alternating power generating circuit 14 and a second transforming circuit 15. The inverter device 4 converts DC power given from the second DC power generating circuit 13 into AC power having a target frequency with the second alternating power generating circuit 14. Then, the inverter device 4 converts the AC power into AC power having a target voltage with the second transforming circuit 15. Consequently, the inverter device 4 generates AC power having a voltage and a frequency capable of driving the discharge tubes and gives the generated AC power to the discharge tubes 5. The discharge tubes 5 are driven to emit light as the AC power is given from the inverter device 4. Such a conventional inverter device 4 is disclosed in Japanese Unexamined Patent Publications JP-A 6-197555 (1994), JP-A 2000-12256, and JP-A 56-88678 (1981). In addition, the DC conversion device 3 is disclosed in Japanese Unexamined Patent Publication JP-A 5-137326 (1993).

In order to drive the discharge tubes 5, the conventional liquid crystal display apparatus 1 has to give power to the discharge tubes 5 from the AC commercial power supply 2 via the first DC power generating circuit 10, the first alternating power generating circuit 11, the first transforming circuit 12, the second DC power generating circuit 13, the second alternating power generating circuit 14, and the second transforming circuit 15. In this case, power loss occurs in each of these circuits 10 to 15.

The conventional liquid crystal display apparatus 1 mentioned above converts commercial AC power into DC power with the DC conversion device 3, further converts the converted DC power into AC power of a high frequency and a high voltage with the inverter device 4, and gives the converted AC power to the discharge tubes 5.

In order to realize an increase in size and an increase in luminance of a display screen, in the liquid crystal display device 1, the discharge tubes 5 tend to be longer and increase in number. In this case, a ratio of power consumption of the discharge tubes 5 with respect to power consumption of the entire liquid crystal display apparatus increases. Since power loss in the DC conversion device 3 and the inverter device 4 increases in accordance with the increase in power consumption of the discharge tubes 5, there is a strong demand for improvement of the power loss in the power conversion.

Conventionally, improvement of the power loss has been pursued in the DC conversion device 3 and the inverter device 4, separately. However, significant reduction of the power loss has not been realized. In addition, such a problem is also present in a drive system that has a DC drive device and an AC drive device and is given AC power from a power source.

SUMMARY OF THE INVENTION

Therefore, it is an object of the invention to provide a drive system with small power loss in power conversion.

The invention provides a drive system that is given AC power from an AC power supply to drive targets to be activated, comprising:

an AC conversion device for acquiring AC power from an AC power supply and converting the supplied AC power into converted AC power having a predetermined frequency and a predetermined voltage;

an AC drive device that is given the converted AC power to be activated;

a DC conversion device for acquiring AC power from an AC power supply and converting the supplied AC power into converted DC power having a predetermined voltage; and a DC drive device that is given the converted DC power to be activated, wherein the AC conversion device has a frequency converting unit for converting a frequency of AC power into a predetermined frequency and a voltage converting unit for converting a voltage of AC power into a predetermined voltage, and the frequency converting unit includes only one pair of a DC power generating circuit for AC conversion and an alternating power generating circuit for AC conversion, in which the DC power generating circuit for AC conversion converts the supplied AC power into DC power, and the alternating power generating circuit for AC conversion converts DC power which is generated by the DC power generating circuit for AC conversion, into AC power of a predetermined frequency.

According to the invention, when AC power is given from an AC power supply, the drive system converts the supplied AC power into converted AC power having a predetermined frequency and a predetermined voltage with the AC conversion device to drive the AC drive device with the converted AC power. Similarly, when AC power is given from an AC power supply, the drive system converts the supplied AC power into converted DC power having a predetermined voltage with the DC conversion device to drive the DC drive device with the converted DC power. In this way, the drive system of the invention has at least two systems of conversion devices that convert the supplied AC power from the AC power supply.

The AC conversion device converts the supplied AC power into DC power with the DC power generating circuit for AC conversion. Then, the AC conversion device converts the converted DC power into AC power having a predetermined frequency with the alternating power generating circuit for AC conversion. The AC conversion device generates a converted AC voltage having a predetermined voltage with the voltage converting unit from the AC power having the predetermined frequency and gives the converted AC voltage to the AC drive device.

In addition, in the invention, the voltage converting unit includes:

a first transformer for dropping a voltage of AC power generated by the alternating power generating circuit for AC conversion, and generating power electrically insulated against the AC power supply; and a second transformer for boosting the voltage of AC power dropped by the first transformer and generating converted AC power, and wherein the second transformer is directly driven by an alternating voltage outputted from the first transformer.

According to the invention, AC power generated by the alternating power generating circuit for AC conversion is given to the first transformer. The first transformer drops a voltage of the AC power, generates power electrically insulated against an AC power supply, and gives the generated power to the second transformer. The second transformer boosts the power given from the first transformer and gives the boosted power to the AC drive device. The AC drive device performs a predetermined drive operation as the power boosted by the second transformer is given to the AC drive device.

Since the first transformer and the second transformer are directly connected to each other, it is possible to make a rectifying circuit, which coverts AC power outputted from the first transformer into DC power, and an alternating power generating circuit, which converts DC power outputted the rectifying circuit into an alternating voltage, unnecessary. Moreover, since the first transformer drops alternating power, it is possible to reduce a voltage to be given while power is transmitted from the first transformer to the second transformer. In addition, since the first transformer is electrically insulated against the AC power supply, it is possible to prevent power from leaking between the first transformer and the second transformer. For example, the second transformer may be realized by either an electromagnetic transformer or a piezoelectric transformer.

In the invention, the voltage converting unit is realized by a single transformer for transforming a voltage of alternating power generated by the alternating power generating circuit for AC conversion and generating converted AC power electrically insulated against an AC power supply.

According to the invention, since the voltage converting unit is realized by one transformer, compared with the case in which a plurality of transformers are provided in the voltage converting unit, it is possible to reduce copper loss and iron loss, which occur in the transformer.

In the invention, the DC conversion device includes:

a first DC power generating circuit for DC conversion, for converting the supplied AC power to be given into DC power;

an alternating power generating circuit for DC conversion, for converting the DC power generated by the AC power of a predetermined frequency;

a transforming circuit for DC conversion, for converting a voltage of the AC power converted by the alternating power generating circuit for DC conversion into a predetermined voltage; and a second DC power generating circuit for DC conversion, for converting the AC power converted by the transforming circuit for DC conversion into DC power, and the DC power generating circuit for AC conversion and the first DC power generating circuit for DC conversion are realized by one circuit used as both the circuits.

According to the invention, since the DC power generating circuit for AC conversion and the first DC power generating circuit for DC conversion are realized by one circuit used as both the circuits, it is possible to further reduce the number of components of the drive system.

In the invention, the voltage converting unit includes:

a transformer for converting a voltage of AC power to be given; and a capacitor that is connected to a primary winding of the transformer in series.

According to the invention, a direct-current first DC power generating circuit for DC conversion into AC power of a predetermined frequency;

a transforming circuit for DC conversion, for converting a voltage of the AC power converted by the alternating power generating circuit for DC conversion into a predetermined voltage; and a second DC power generating circuit for DC conversion, for converting the AC power converted by the transforming circuit for DC conversion into DC power, and the DC power generating circuit for AC conversion is realized by the same circuit structure as the first DC power generating circuit for DC conversion, and the alternating power generating circuit for AC conversion is realized by the same circuit structure as the alternating power generating circuit for DC conversion.

According to the invention, it is possible to divert circuit components for the DC conversion device to constitute parts of the AC conversion device.

In the invention, the DC conversion device includes:

a first DC power generating circuit for DC conversion, for converting the supplied AC power to be given into DC power;

an alternating power generating circuit for DC conversion, for converting the DC power generated by the first DC power generating circuit for DC conversion into component of a current flowing in the primary winding of the transformer is removed by the capacitor. Further, it is possible to prevent DC superimposition from occurring in the transformer of the voltage converting unit. Consequently, even in the case in which there is a bias between a positive side waveform and a negative side waveform of AC power generated by the alternating power generating circuit for AC conversion, it is possible to prevent a bias from occurring in a magnetic flux density of the transformer.

In the invention, the voltage converting unit further has a filter circuit part for attenuating a harmonic component of frequency components included in the AC power outputted from the frequency converting unit.

According to the invention, it is possible to attenuate a harmonic component of AC power with the filter circuit part to control occurrence of radiation noise. In addition, even in the case in which a voltage waveform of AC power generated by the frequency converting unit is a rectangular waveform, it becomes possible to bring a waveform of AC power given to the AC drive device close to a sine waveform.

In the invention, the voltage converting unit includes:
a transformer for converting a voltage of AC power to be given; and
a bypass line for connecting an intermediate part of a coil-like portion of a primary winding of the transformer and one end part of the primary winding, and
wherein an inductor for current superimposition is connected to the bypass line in series.

According to the invention, it is possible to superimpose a circulating current caused by the inductor over a primary winding current flowing in the primary winding of the transformer by giving inductance to the primary winding of the transformer. Consequently, in generating alternating power with a switching element, it is possible to generate zero-volt switching (abbreviated as ZVS) when the switching element is turned on and to reduce switching loss. Consequently, it is possible to control heat generation of the switching element.

In the invention, the frequency converting unit further has a power-factor improving circuit for improving a power factor at the time when the supplied AC power is converted into DC power by the DC power generating circuit for AC conversion.

According to the invention, it is possible to improve a power factor of the drive system by the power-factor improving circuit. For example, the power-factor improving circuit may be realized by a so-called active filter circuit. The active filter circuit can also be provided with a function of stabilizing the supplied AC power even if fluctuation occurs in the supplied AC power.

In the invention, the drive system is a liquid crystal display apparatus that is given AC power and drives discharge tubes.

According to the invention, the discharge tubes serve as AC drive devices. Since converted AC power is directly given to the discharge tubes from the AC conversion device, it is possible to reduce conversion steps for generating the converted AC power given to the discharge tubes.

In addition, the invention provides an AC conversion device provided in the drive system.

That is, the invention provides an AC conversion device for acquiring AC power from an AC power supply and converting the supplied AC power into converted AC power having a predetermined frequency and a predetermined voltage, the AC conversion device comprising:
a frequency converting unit for converting a frequency of AC power into a predetermined frequency; and
a voltage converting unit for converting a voltage of AC power into a predetermined voltage,
wherein the frequency converting unit includes only one pair of a DC power generating circuit for AC conversion and an alternating power generating circuit for AC conversion, in which the DC power generating circuit for AC conversion converts the supplied AC power into DC power, and the alternating power generating circuit for AC conversion converts DC power which is generated by the DC power generating circuit for AC conversion, into AC power of a predetermined frequency.

According to the invention, since the AC conversion device is provided in the drive system, it is unnecessary to further convert converted DC power generated from the DC conversion device, and it is possible to reduce conversion steps necessary for generating converted AC power.

According to the invention, it is possible to output the converted AC power and the converted DC power in different systems. Therefore, the converted AC power outputted from the AC conversion device can be given to the AC drive device directly without the intervention of the DC conversion device.

In the related art mentioned above, in order to generate converted AC power, it is necessary to further convert the converted DC power generated by the DC conversion device and generate converted AC power. Therefore, in order to generate the converted AC power, other conversion steps are required after the conversion step of generating the converted DC power.

On the other hand, in the invention, it is possible to give the converted AC power outputted from the AC conversion device to the AC drive device directly. Therefore, compared with the related art, it is possible to reduce conversion steps for generating converted AC power and to reduce power loss that occurs in the conversion steps. In particular, in the case in which power supplied to the AC drive device is larger than power supplied to the DC drive device, it is possible to reduce power loss of the entire drive system effectively by providing the AC conversion device.

In addition, in the case in which power supplied to the AC drive device is larger than power supplied to the DC drive device, it is possible to prevent power concentration to the DC conversion device by dividing a power supply device into two systems. Consequently, it is possible to reduce allowable power of the DC conversion device and the DC drive device and to realize reduction in size of the DC conversion device and the DC drive device.

According to the invention, the first transformer, which is electrically insulated against the AC power and generates dropped power, and the second transformer, which generates the converted AC power, are directly connected to each other. Consequently, it is possible to make the rectifying circuit, which converts AC power outputted from the first transformer into DC power, and an alternating power generating circuit, which converts DC power outputted from the rectifying circuit into an alternating voltage, unnecessary. As a result, it is possible to realize reduction in power loss. In addition, it is possible to realize reduction in size and reduction in cost. Moreover, it is possible to lower a voltage of power flowing between the first transformer and the second transformer. Therefore, it is possible to use components with a low withstand voltage property for electric and electronic components arranged between the first transformer and the second transformer and to constitute the drive system inexpensively.

In addition, it is possible to prevent power from leaking between the first transformer and the second transformer.

Note that it is preferable that the first transformer is provided close to the alternating power generating circuit for AC conversion and the second transformer is provided close to the AC drive device. Consequently, it is possible to widen a section where an applied voltage is low. In the case in which a plurality of AC drive devices are provided, a plurality of second transformers may be provided in the respective AC drive devices. Consequently, it is possible to reduce a distance from the respective second transformers to the corresponding AC drive devices.

According to the invention, the voltage converting unit is realized by a single transformer. Consequently, compared with the case in which a plurality of transformers are provided in the voltage converting unit, it is possible to reduce copper loss and iron loss that occur in the transformer. As a result, it is possible to reduce power loss in the drive system and to realize improvement of reliability and effective use of energy through reduction in internal loss of the devices. Moreover, since the single transformer is used instead of the plurality of second transformers, it is possible to reduce the number of transformers and to manufacture the transformer inexpensively.

According to the invention, the DC power generating circuit for AC conversion is realized by the same structure as the first DC power generating circuit for DC conversion. In addition, the alternating power generating circuit for AC conversion is realized by the same structure as the alternating power generating circuit for DC conversion. Consequently, it is possible to divert circuit components for the DC conversion device to constitute the AC conversion device and to reduce manufacturing cost. In addition, it is possible to simplify inventory management of circuit components constituting the AC conversion device and the DC conversion device.

According to the invention, one circuit is used as both the DC power generation circuit for AC conversion and the first DC power generating circuit for DC conversion. Consequently, it is possible to reduce the number of components of the drive system. As a result, it is possible to reduce a size of the drive system and to manufacture the drive system inexpensively.

According to the invention, even in the case in which there is a bias between a positive side waveform and a negative side waveform of AC power waveforms generated by the alternating power generating circuit for AC conversion, it is possible to prevent a bias from occurring in a magnetic flux density of the transformer with the capacitor. Consequently, it is possible to prevent magnetic saturation of the transformer. Therefore, it is possible to prevent an excessive current from flowing in the respective circuits constituting the drive system and prevent damage to the drive system to improve reliability.

According to the invention, it is possible to reduce occurrence of radiation noise by attenuating a harmonic component of AC power with the filter circuit part. Consequently, it is possible to reduce noise given to other electronic devices by the drive system. In addition, it is also possible to bring a waveform of AC power given to the AC drive device close to a sine waveform by the intervention of the filter circuit part even if a voltage waveform of power generated by the frequency converting unit is a rectangular waveform. Consequently, in the case in which the AC drive device is activated more stably when AC power of a sine waveform is given, it is possible to drive the AC drive device stably. For example, in the case in which the AC drive device is a discharge tube, it is possible to cause the discharge tube stably by giving AC power of the sine waveform to the discharge tube.

According to the invention, it is possible to superimpose a circulating current caused by the inductor over a primary winding current flowing in the primary winding of the transformer by giving inductance to the primary winding of the transformer. Consequently, in generating alternating power with a switching element, it is possible to generate zero-volt switching (abbreviated as ZVS) when the switching element is turned on and reduce switching loss. Consequently, it is possible to control heat generation of the switching element.

According to the invention, a power factor of the drive system is improved by the power-factor improving circuit. Consequently, an AC power supply does not need excess supply capability exceeding power consumption of the drive system to drive the drive system. Therefore, it is possible to connect the drive system to an AC power supply having supply capability suitable for power consumption thereof.

For example, the power-factor improving circuit is realized by the active filter circuit, whereby the active filter circuit can also be provided with a function of stabilizing the supplied AC power given to the alternating power generating circuit for AC conversion even if fluctuation occurs in the supplied AC power. Consequently, it is possible to reduce control burden on the alternating power generating circuit for AC conversion.

According to the invention, since the AC drive device is realized by a discharge tube, it is possible to reduce power loss of the liquid crystal display apparatus. In particular, in the case in which a ratio of power consumption by the discharge tubes in the liquid crystal display apparatus increases to realize an increase in size and an increase in luminance of the display screen of the liquid crystal display apparatus, it is possible to control power supply of the liquid crystal display apparatus effectively. It is possible to prevent concentration of power on the DC conversion device by dividing the power supply system into two systems for AC power and DC power. Moreover, it is possible to realize reduction in size of the AC conversion device and the DC conversion device, and as a result, it is possible to realize reduction in size of the liquid crystal apparatus.

According to the invention, since the AC conversion device is provided in the drive system, it is possible to reduce conversion steps required for generating converted AC power, and power loss of the drive system.

BRIEF DESCRIPTION OF THE DRAWINGS

Other and further objects, features, and advantages of the invention will be more explicit from the following detailed description taken with reference to the drawings wherein.

DETAILED DESCRIPTION

Figure 1:
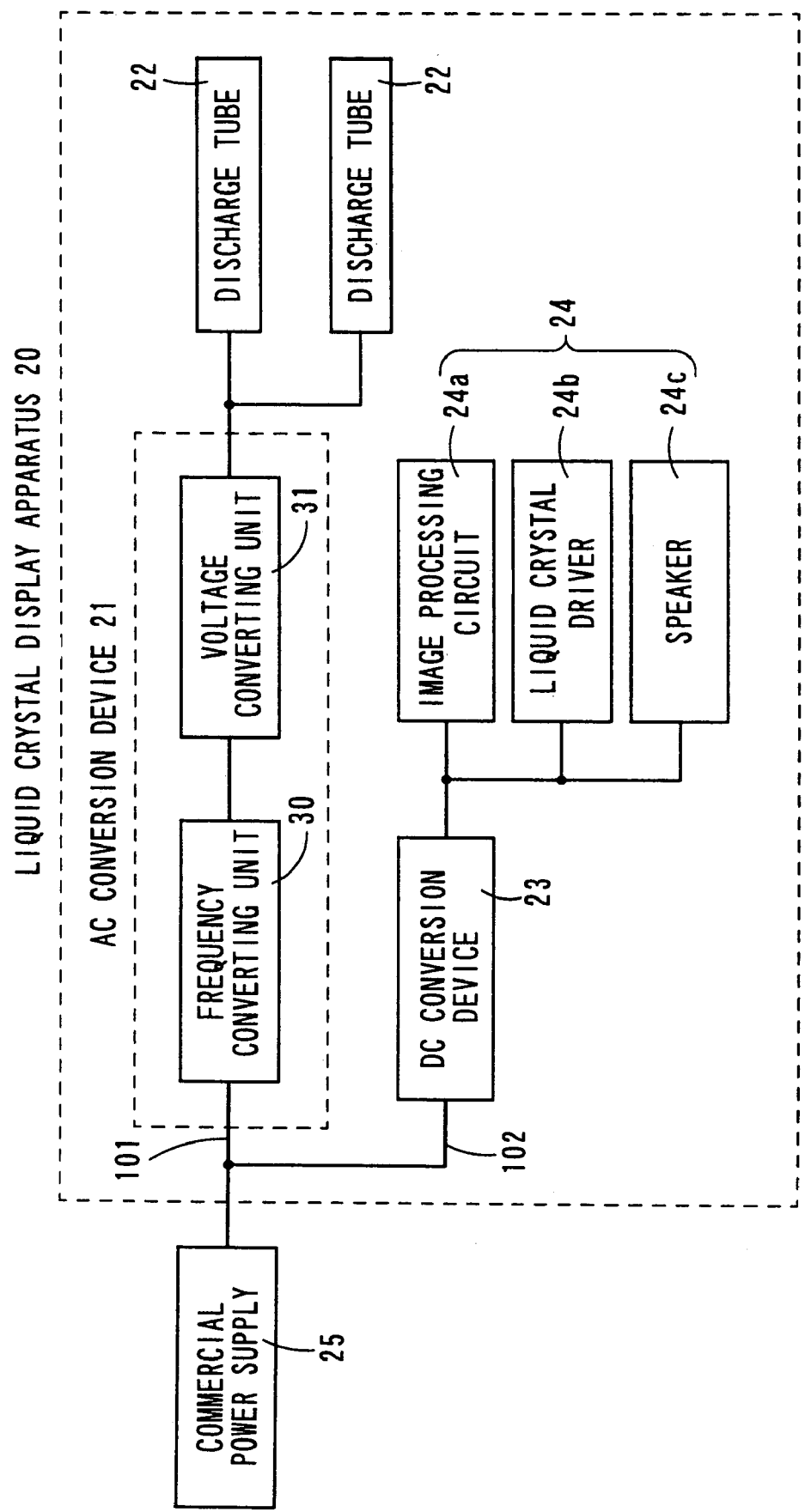
FIG. 1 is a block diagram showing a liquid crystal display apparatus according to one embodiment of the invention.

Now referring to the drawings, preferred embodiments of the invention are described below.

FIG. 1 is a block diagram showing a liquid crystal display apparatus 20 according to one embodiment of the invention. The liquid crystal display apparatus 20 is one of drive systems that are given AC power from a commercial power supply to be driven. The liquid crystal display apparatus 20 means, for example, a television receiver having a liquid crystal monitor and a personal computer having a liquid crystal monitor.

The liquid crystal display apparatus 20 includes an AC conversion device 21, discharge tubes 22, a DC conversion device 23, and DC drive devices 24a, 24b, and 24c. The AC conversion device 21 acquires AC power supplied from a commercial power supply 25 (hereinafter referred to as commercial AC power), converts the supplied AC power into converted AC power having a predetermined frequency and a predetermined voltage, and gives the converted AC power to the discharge tubes 22. The discharge tubes 22 are cold cathode discharge tubes each of which is driven to emit light as the converted AC power is given and serve as AC drive devices that are activated by converted AC power. Note that, in the embodiment, the liquid crystal display apparatus 20 includes a plurality of discharge tubes 22. The discharge tubes may be called fluorescent lamps.

The DC conversion device 23 acquires commercial AC power, converts the commercial AC power into converted DC power having a predetermined voltage, and gives the converted DC power to the respective DC drive devices 24a to 24c. Note that, hereinafter, the respective DC drive devices 24a to 24c may be collectively referred to as the DC drive devices 24. The DC drive devices 24 are devices that are driven by converted DC power. The DC drive devices 24 are, for example, an image processing circuit 24a, a liquid crystal driver 24b, and a speaker 24c. In this way, the AC conversion device 21 and the DC conversion device 23 serve as power supply devices that convert the supplied AC power and give the supplied AC power to the respective drive devices 22 and 24a to 24c.

In the case in which the liquid crystal display device 20 is a television receiver, the television receiver receives image data and voice data with a receiver. In addition, in the case in which the liquid crystal display apparatus 20 is a personal computer, the personal computer generates image data and voice data with a CPU (Central Processing Unit). In this way, the liquid crystal display apparatus 20 acquires image data, which should be displayed, and voice data with some acquiring means and gives the acquired image data to the image processing circuit 24a. The image processing circuit 24a generates a pixel signal according to the given image data. The pixel signal is generated for each pixel constituting an image represented by the image data. The image processing circuit 24a is realized by, for example, an LSI (Large-Scale Integration).

The image processing circuit 24a gives the respective generated pixels signals to the liquid crystal driver 24b. The liquid crystal driver 24b changes a light transmission state of a liquid crystal display substrate partially according to the given respective pixel signals. In addition, the discharge tubes 22 irradiate the liquid crystal display substrate with irradiation light to be backlight. At this point, on the liquid crystal display substrate, the light transmission state changes partially according to an image to be displayed. Therefore, the light from the discharge tubes 22 is transmitted through the liquid crystal display substrate selectively according to the image to be displayed and exits from the liquid crystal display substrate. The exit light exiting from the liquid crystal display substrate reaches a display screen, whereby the image is displayed on the display screen.

In the liquid crystal display apparatus 20, a voice processing circuit (not shown) generates a voice signal from the acquired voice data and gives the voice signal to the speaker 24c. The speaker 24c is given the voice signal to thereby emit voice to be generated. The voice processing circuit is also one of the DC drive devices.

Figure 2:
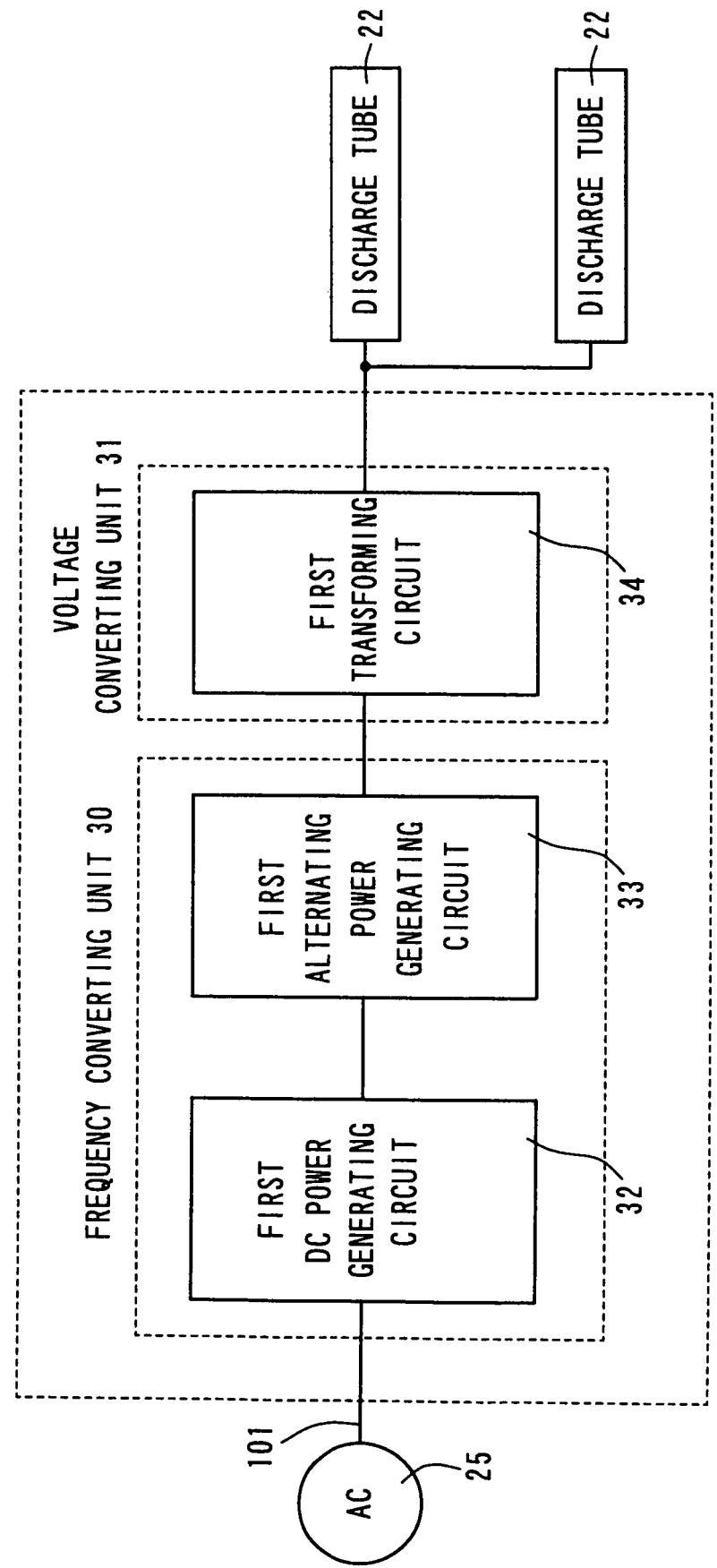
FIG. 2 is a block diagram showing a structure of an AC conversion device.

FIG. 2 is a block diagram showing a structure of the AC conversion device 21. The AC conversion device 21 has a frequency converting unit 30 and a voltage converting unit 31. The frequency converting unit 30 converts a frequency of AC power to be given into a predetermined frequency. In addition, the voltage converting unit 31 converts a voltage of the given AC power into a predetermined voltage. In this case, the predetermined frequency and the predetermined voltage are determined to be equal to a drive voltage and a drive frequency of the AC drive devices. For example, in the case in which the AC drive devices are the discharge tubes 22, an effective value of the predetermined voltage is set to 1000 Vrms (root mean square) as an example. In addition, the predetermined frequency is set to 40 kHz as an example.

Note that, in the invention, AC power only has to have a voltage that is alternately changed to positive and negative repeatedly with respect to a predetermined set voltage. A waveform of the voltage may be an alternating waveform other than a sine waveform. For example, the AC power includes the case in which the voltage waveform is a rectangular waveform and a triangular waveform that are alternately switched to positive and negative with respect to the set voltage. In addition, in the invention, DC power may not be a constant voltage with respect to the set voltage.

The frequency converting unit 30 includes only one pair of a first DC power generating circuit 32 and a first alternating power generating circuit 33. The first DC power generating circuit 32 serves as a DC power generating circuit for AC conversion for converting AC power to be given into DC power. In addition, the first alternating power generating circuit 33 serves as an alternating power generating circuit for AC conversion, for converting DC power to be given into AC power of a predetermined frequency.

In this way, in the AC conversion device 21, only one frequency converting unit 30 is provided. In addition, only one pair of the first DC power generating circuit 32 and the first alternating power generating circuit 33 is provided in the frequency converting unit 30. In other words, in the AC conversion device 21, a plurality of DC power generating circuits and a plurality of alternating power generating circuits are not present. The frequency converting unit 30 directly gives converted AC power to the voltage converting unit 31.

The voltage converting unit 31 includes a first transforming circuit 34. The first transforming circuit 34 serves as a transforming circuit for AC conversion, for converting a voltage of AC power into a predetermined voltage. The transforming circuit 34 includes a transformer. However, the number of transformers included in the first transforming circuit 34 may be one or more.

The commercial power supply 25 is connected to the liquid crystal display apparatus 20 and gives commercial AC power to the first DC power generating circuit 32. The first DC power generating circuit 32 converts the commercial AC power into DC power and gives the converted DC power to the first alternating power generating circuit 33. The first alternating power generating circuit 33 converts DC power to be given into AC power of a predetermined frequency and gives the converted AC power to the first transforming circuit 34. The first transforming circuit 34 converts AC power to be given into AC power of a predetermined voltage and gives the converted AC power to the discharge tubes 22 as converted alternating power.

Figure 3:
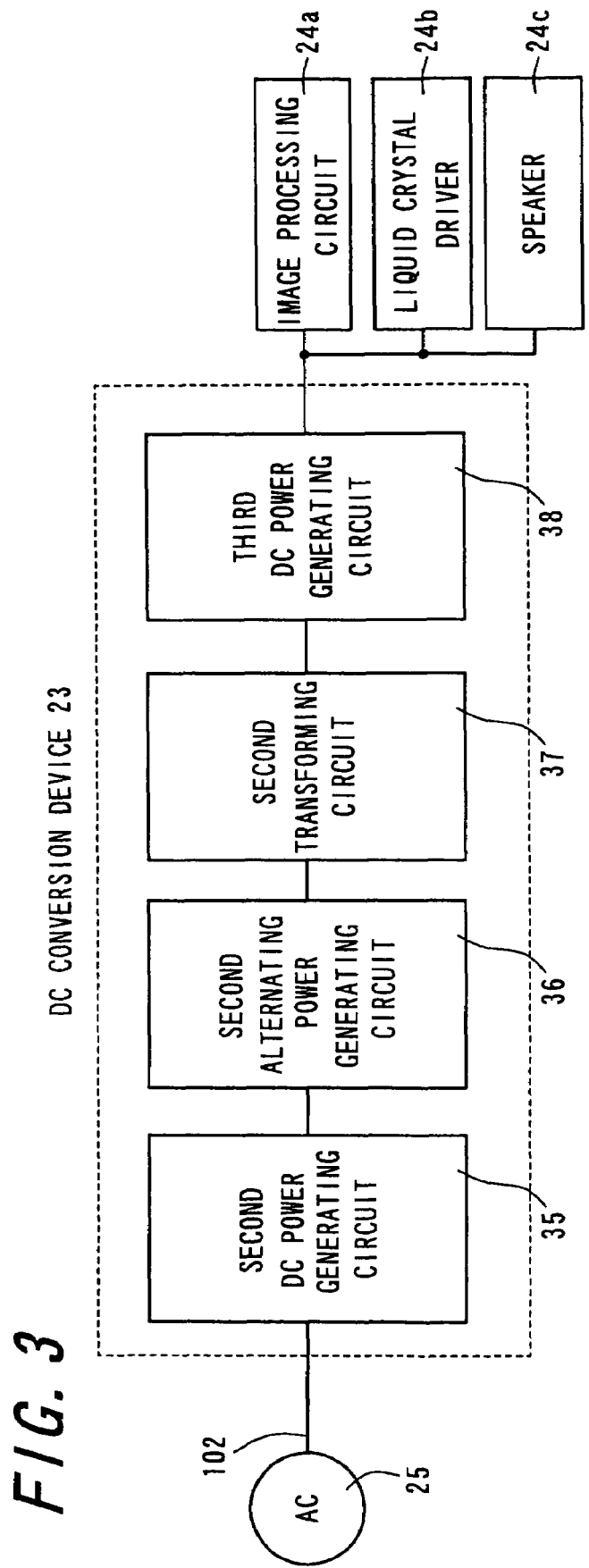
FIG. 3 is a block diagram showing a structure of a DC conversion device.

FIG. 3 is a block diagram showing a structure of the DC conversion device 23. The DC conversion device 23 converts AC power to be given into DC power of a predetermined voltage. In this case, the predetermined voltage is determined to be equal to a drive voltage for the DC drive devices 24. For example, in the case in which the DC drive devices 24 are the image processing circuit 24a, the liquid crystal driver 24b, and the speaker 24c, the predetermined DC voltage is set to 12 to 40 V as an example.

The DC conversion device 23 includes a second DC power generating circuit 35, a second alternating power generating circuit 36, a second transforming circuit 37, and a third DC power generating circuit 38. The second DC power generating circuit 35 and the third DC power generating circuit 38 convert AC power to be given into DC power. The second DC power generating circuit 35 serves as a first DC power generating circuit for DC conversion, and the third DC power generating circuit 38 serves as a second DC power generating circuit for DC conversion. The second alternating power generating circuit 36 serves as an alternating power generating circuit for DC conversion, for converting DC power to be given into AC power of a predetermined frequency. The second transforming circuit 37 serves as a transforming circuit for DC conversion, for transforming a voltage of AC power to be given.

The commercial power supply 25 is connected to the DC conversion device 23 and gives commercial AC power to the second DC power generating circuit 35. The second DC power generating circuit 35 converts the given commercial AC power into DC power and gives the converted DC power to the second alternating power generating circuit 36. The second alternating power generating circuit 36 converts the given DC power into AC power of a predetermined frequency and gives the converted AC power to the second transforming circuit 37. The second transforming circuit 37 converts the given AC power into AC power of a predetermined voltage and gives the converted AC power to the third DC power generating circuit 38. The third DC power generating circuit 38 converts the given AC power into DC power and gives the converted DC power to the respective DC drive devices 24a to 24c as converted DC power.

Figure 4:
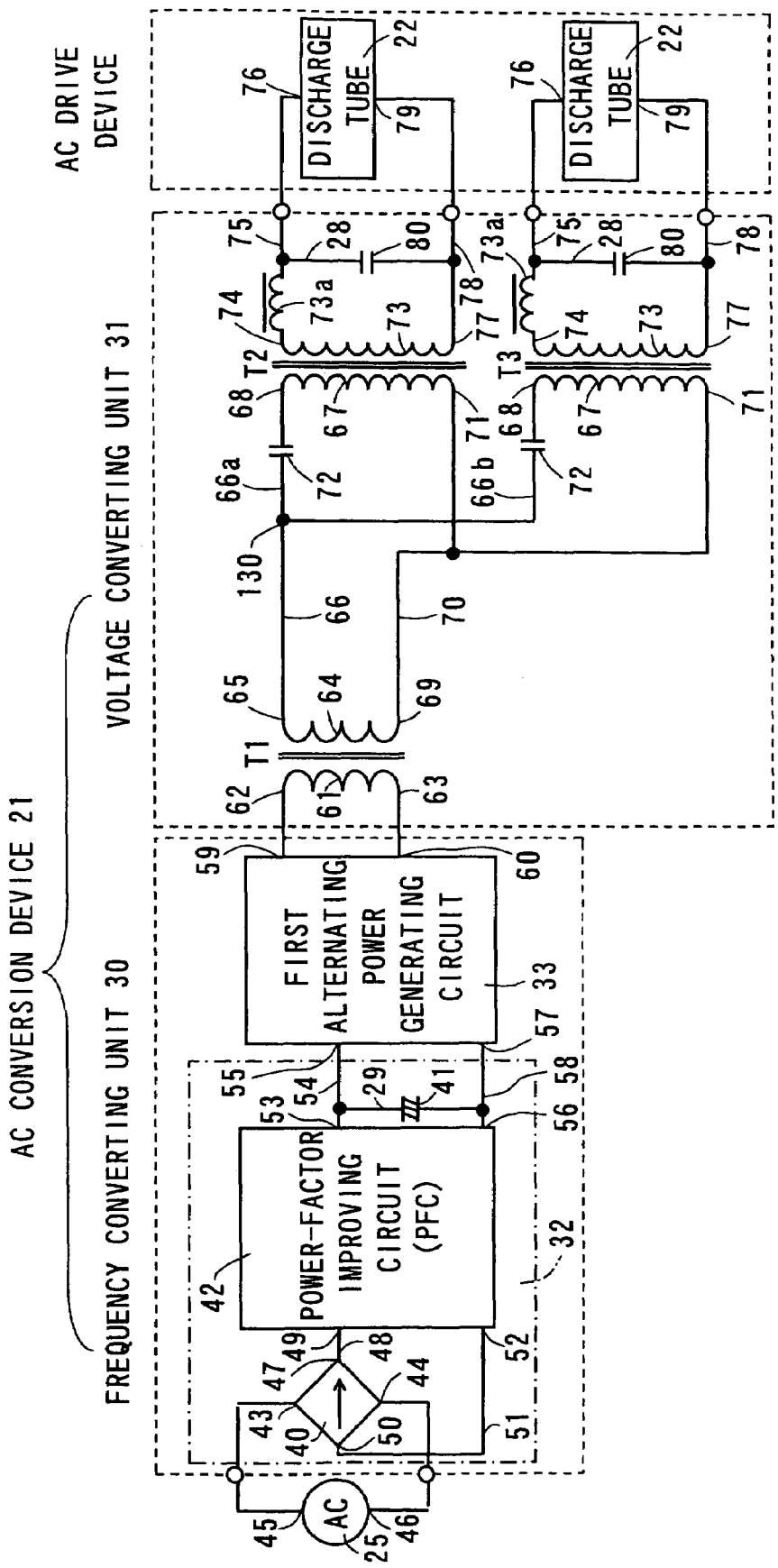
FIG. 4 is a circuit diagram showing a main structure of the AC conversion device.

FIG. 4 is a circuit diagram showing a main structure of the AC converting device 21. In this embodiment, the first DC power generating circuit 32 is realized by including a rectifying and smoothing circuit of a capacitor input type, which constituted by a rectifier 40 and a smoothing capacitor 41, and a power-factor improving circuit 42 for improving a power factor. The power-factor improving circuit 42 may be called a PFC (Power Factor Correction) circuit. In addition, in this embodiment, the rectifier 40 is realized by a bridge full-wave rectifying circuit using a diode.

Two input terminals 43 and 44 of the rectifier 40 are connected to two output terminals 45 and 46 of the commercial power supply 25. One output terminal 47 of the rectifier 40 is connected to one input terminal 55 of the first alternating power generating circuit 33 via one line 48 and 54. In addition, the other output terminal 50 of the rectifier 40 is connected to the other input terminal 57 of the first alternating power generating circuit 33 via the other line 51 and 58. In this embodiment, the power-factor improving circuit 42 is interposed between the rectifier 40 and the first alternating power generating circuit 33. In addition, a connection line 29 connecting one line 48 and 54 and the other line 51 and 58 is provided and the smoothing capacitor 41 is connected to the connection line 29 in series.

More specifically, one output terminal 47 of the rectifier 40 is connected to one input terminal 49 of the power-factor improving circuit 42 by the first line 48. In addition, the other output terminal 50 of the rectifier 40 is connected to the other input terminal 52 of the power-factor circuit 42 by the second line 51. One output terminal 53 of the power-factor improving circuit 42 is connected to one input terminal 55 of the first alternating power generating circuit 33 by the third line 54. In addition, the other output terminal 56 of the power-factor improving circuit 42 is connected to the other input terminal 57 of the first alternating power generating circuit 33 by the fourth line 58. The first connection line 29 connecting the third line 54 and the fourth line 58 is formed in the first DC power generating circuit 32. The smoothing capacitor 41 is interposed in the first connection line 29 and connected to the first line 29 in series.

The rectifier 40 subjects commercial AC power to full-wave rectification and gives the power to the power-factor improving circuit 42. The power-factor improving circuit 42 improves a power factor at the time when the AC power is converted into DC power subjected to the full-wave rectification by the rectifier 40. In addition, in the embodiment, the power-factor improving circuit 42 outputs DC power boosted higher than a power of AC power supplied from the commercial power supply 25. The smoothing capacitor 41 smoothes the DC power subjected to the full-wave rectification by the rectifier 40. In this way, the first DC power generating circuit 32 generates DC power obtained by rectifying and smoothing AC power and gives the generated DC power to the first power generating circuit 33.

Note that, in this embodiment, the first DC power generating circuit 35 is realized by the rectifying and smoothing circuit of the capacitor input type. However, the first DC power generating circuit 35 may be realized by a rectifying and smoothing circuit of a choke coil input type instead of the rectifying and smoothing circuit of the capacitor input type or may be realized by other rectifying circuits. An optimum rectifying circuit is selected according to a structure of the first alternating power generating circuit 33.

The first alternating power generating circuit 33 is realized by an inverter circuit for converting DC power into AC power. The first alternating power generating circuit 33 converts DC power given from the first DC power generating circuit 32 into high-frequency AC power and gives the high-frequency AC power to the voltage converting unit 31. As the first alternating power generating circuit 33, for example it is possible to use a push-pull type, a half-bridge type, or a full-bridge type alternating power generating circuit. Note that a waveform of the AC power generated by the first alternating power generating circuit 33 does not always have to be a sine waveform and may be a rectangular waveform.

The voltage converting unit 31 includes a first transformer T1 for transforming the AC power generated by the first alternating power generating circuit 33 and second transformers T2 and T3 for further transforming the AC power transformed by the first transformer T1. The second transformers T2 and T3 are provided for each of the discharge tubes 22. Note that the first transformer T1 is designed in accordance with a predetermined safety standard. In accordance with the safety standard, conditions concerning an electric insulating performance, a withstand voltage performance, a converted voltage of a primary winding 61 and a secondary winding 64, and the like are set for the first transformer T1 in advance.

The respective transformers include a primary winding extending in a coil shape, a secondary winding extending in a coil shape, and a core piercing through the primary winding and the secondary winding along central axes thereof. The core is made of a magnetic material and is realized by, for example, an iron core. AC power is flowing through the primary winding, whereby magnetic fluxes in the core change. As a result, an electromotive force is generated in the secondary winding. A turn ratio of the primary winding and the secondary winding is adjusted, whereby it is possible to transform the electromotive force generated in the secondary winding with respect to power given to the primary winding.

Two terminals 62 and 63 of a primary winding 61 of the first transformer T1 are connected to two output terminals 59 and 60 of the first alternating power generating circuit 33, respectively. The first alternating power generating circuit 33 generates AC power, whereby an AC current flows in the primary winding 61 of the first transformer T1. Since the turn ratio of the primary winding 61 and a secondary winding 64 of the first transformer T1 is set in advance, it is possible to derive AC power transformed to a predetermined voltage from the secondary winding 64 of the first transformer T1. Note that a center tap may be added to the first transformer T1 according to the first alternating power generating circuit 33.

Actually, it is possible to realize the first DC power generating circuit 32, the first alternating power generating circuit 33, and the first transformer T1 with remaining components excluding a part of components of a switching power supply circuit. The switching power supply circuit is a power supply circuit that includes a first rectifying circuit, a DC/AC conversion circuit, a transforming circuit, and a second rectifying circuit and converts commercial AC power into a DC power. That is, the first DC power generating circuit 32, the first alternating power generating circuit 33, and the first transformer T1, which are embodiments of the invention, may be realized by remaining components excluding the second rectifying circuit of the switching power circuit.

One terminal 65 of the secondary winding 64 of the first transformer T1 is connected to one terminals 68 of primary windings 67 of the secondary transformers T2 and T3 by a fifth line 66. In addition, the other terminal 69 of the secondary winding 64 of the first transformer T1 is connected to the other terminals 71 of the primary windings 67 of the second transformers T2 and T3 by a sixth line 70. Note that, in FIG. 4, leakage inductances present in secondary windings 73 of the second transformers T2 and T3 are denoted by reference numeral 73a.

In the case in which the plurality of second transformers T2 and T3 are provided, the fifth line 66 and the sixth line 70 are branched into a plurality of lines and connected to two terminals 68 and 71 of the primary windings 67 of the second transformers T2 and T3. In addition, in the fifth line 66, a branching point 130, where the fifth line 66 is branched, is formed according to the number of the second transformers T2 and T3.

In this embodiment, capacitors for preventing DC superimposition 72 are interposed in series in branched parts 66a and 66b, which are closer to the second transformers T2 and T3 with respect to the branching point 130, of the fifth line 66, respectively. The capacitors for preventing DC superimposition 72 are provided in order to remove a DC component of a current flowing through the primary windings 67 of the second transformers T2 and T3.

When an alternating current flows in the primary winding 64 of the first transformer T1 and the secondary winding 64 of the first transformer T1 derives AC power, an AC current flows in the primary windings 67 of the second transformers T2 and T3. Since the turn ratio of the primary windings 67 and the secondary windings 73 of the second transformers T2 and T3 are set in advance, it is possible to derive AC power transformed to a predetermined voltage from the secondary windings 64 of the second transformers T2 and T3. The AC power derived from the secondary windings 64 of the second transformers T2 and T3 is converted AC power that is capable of driving the discharge tubes 22.

One terminals 74 of the secondary windings 73 of the respective second transformers T2 and T3 are connected to one terminals 76 of the corresponding discharge tubes 22 via seventh lines 75. In addition, the other terminals 77 of the secondary windings 73 of the respective second transformers T2 and T3 are connected to the other terminals 79 of the corresponding discharge tubes 22 via eighth lines 78. In this embodiment, the voltage converting unit 31 has second connection lines 28, which connect corresponding pairs of seventh lines 75 and eighth lines 78, and capacitors for waveform rectification 80, which are interposed in the second connection lines 28. The capacitors for waveform rectification 80 are connected to the second connection lines 28 in series.

The voltage converting unit 31 drops and derives the high-frequency AC power given from the first alternating power generating circuit 33 from the secondary winding 64 of the first transformer T1. The voltage converting unit 31 boosts and derives the AC power, which are derived from the secondary winding 64 of the first transformer T1, from the secondary windings 73 of the second transformers T2 and T3. The voltage converting unit 31 gives converted AC power generated in this way to the discharge tubes 22.

As described above, in the first transformer T1, since the primary winding 61 and the secondary winding 64 are electrically insulated in accordance with the predetermined safety standard, the AC conversion device 21 can give AC power electrically insulated against the commercial power supply 25 to the discharge tubes 22. When it is assumed that a side from the commercial power supply 25 to the primary winding 61 of the first transformer T1 is a primary side, and a side from the secondary winding 64 of the second transformer T2 to the discharge tubes 22 is a secondary side, it is possible to prevent electric shock on the secondary side of the liquid crystal display apparatus 1.

Figure 5:
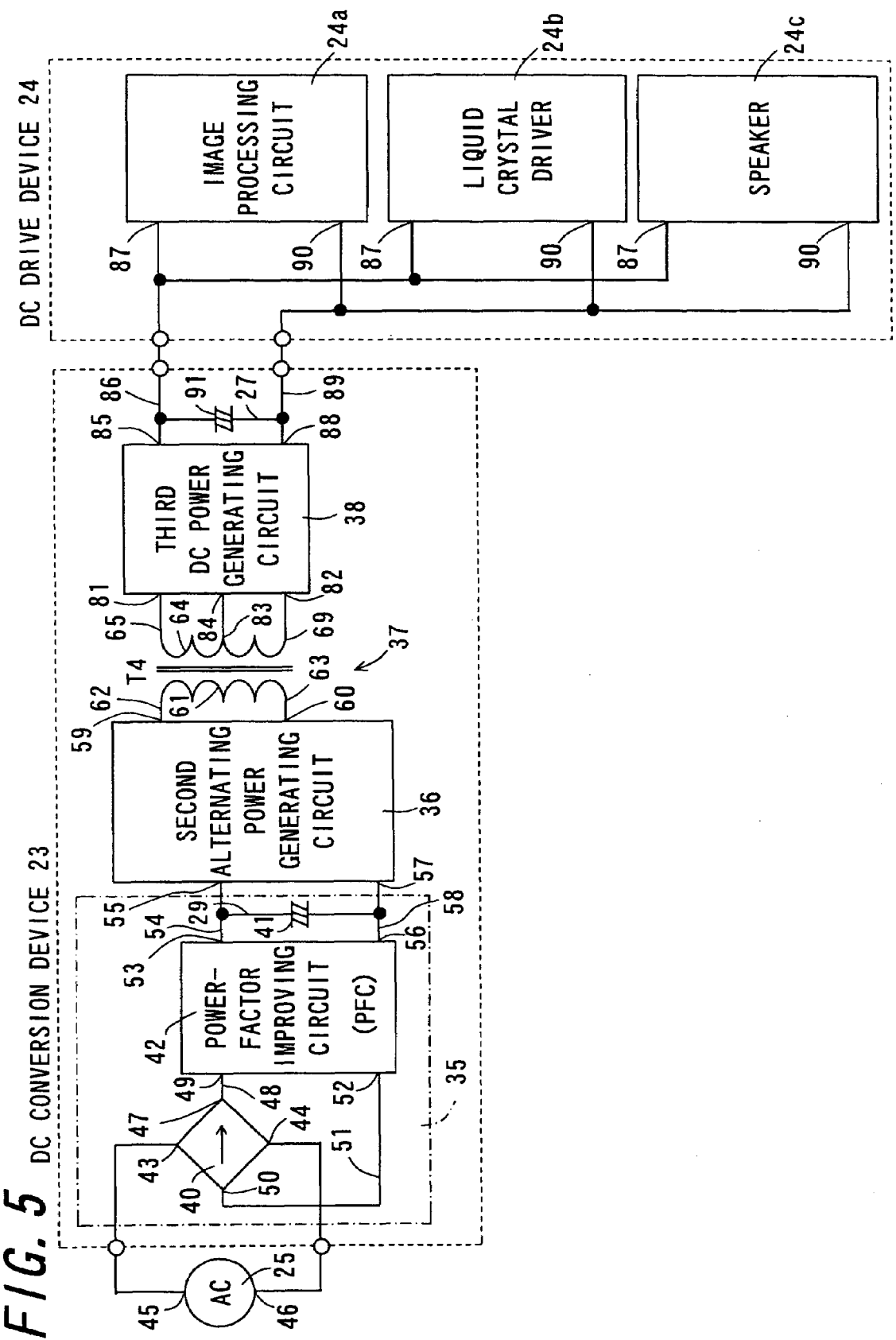
FIG. 5 is a circuit diagram showing a main structure of the DC conversion device.

FIG. 5 is a circuit diagram showing a main structure of the DC conversion device 23. In this embodiment, the second DC power generating circuit 35 has the same circuit structure as the first DC power generating circuit 32 of the AC conversion device 21. The second alternating power generating circuit 36 has the same circuit structure as the first alternating power generating circuit 33 of the AC conversion device 21. In addition, the second transforming circuit 37 has a third transformer T4 that is the same as the first transformer T1. Parts of the circuit structure of the DC conversion device 23, which are realized by the same circuit structure as the AC conversion device 21, will be denoted by reference numerals that are the same as those in the circuit structure of the AC conversion device 21, and an explanation thereof will be omitted.

The two terminals 62 and 63 of the primary winding 61 of the fourth transformer T4 are connected to the two output terminals 59 and 60 of the second alternating power generating circuit 36, respectively. The second alternating power generating circuit 36 generates AC power, whereby AC current flows in the primary winding 61 of the third transformer T4. Since a turn ratio of the primary winding 61 and the secondary winding 69 of the third transformer T4 is set in advance, it is possible to derive AC power transformed to a predetermined voltage from the secondary winding 64 of the third transformer T4. The two terminals 65 and 69 forming both ends of the secondary winding 64 of the third transformer T4 are connected to two input terminals 81 and 82 of the third DC power generating circuit 38.

The third DC power generating circuit 38 is realized by a center tap full-wave rectifying circuit, a half-wave rectifying circuit without a center tap, or the like and is selected according to a structure of the second alternating power generating circuit 36. For example, as shown in FIG. 5, in the case in which the third DC power generating circuit 38 is the center tap full-wave rectifying circuit, a center terminal 83, which is in a middle position of a coil-forming portion of the secondary winding 64, is connected to an input terminal for center tap 84 other than the two input terminals 81 and 82 of the third DC power generating circuit 38.

One output terminal 85 of the third DC power generating circuit 38 is connected to one input terminals 87 of the respective DC drive devices 24a to 24c via a ninth line 86. In addition, the other output terminal 88 of the third DC power generating circuit 38 is connected to the other input terminals 90 of the respective DC drive devices 24a to 24c via a tenth line 89. In addition, the DC conversion device 23 may have a smoothing capacitor 91 that smoothes DC power generated by the third DC power generating circuit 38. In this case, the DC conversion device 23 has a third connection line 27 connecting the ninth line 86 and the tenth line 89. The smoothing capacitor 91 is interposed in the third connection line 27 and connected to the third connection line in series.

The DC conversion device 23 subjects AC power given from the AC commercial power supply 25 to full-wave rectification with the rectifier 40. In addition, the DC conversion device 23 improves a power factor at the time when the AC power is converted into DC power subjected to the full-wave rectification with the power-factor improving circuit 42 and smoothes the AC power with the smoothing capacitor 41 and converts the AC power into DC power. Then, the DC conversion device 23 converts the DC power into high-frequency AC power with the second alternating power generating circuit 36 and transforms the high-frequency AC power with the third transformer T4. Then, the DC conversion device 23 converts the transformed AC power into DC power with the third DC power generating circuit 38 to generate desired converted DC power. Then, the DC conversion device 23 gives the generated converted DC power to the respective DC drive devices 24a to 24c.

Such a DC conversion device 23 is realized by, for example, a switching power supply circuit. The switching power supply circuit takes root as a basic unit and has a function of supplying DC stabilized power from a commercial power supply. Note that, in accordance with a safety standard set in advance, conditions for insulation of a primary winding and a secondary winding are set for the third transformer T4 in advance. Therefore, the DC conversion device 23 can give DC power electrically insulated against the commercial power supply 25 to the respective DC drive devices 24a to 24c. In this way, the AC conversion device 21 of the invention is a device obtained by combining a power supply device and an inverter device for the discharge tubes 22 for lighting a backlight of the liquid crystal display apparatus 20.

In the liquid crystal display apparatus 20, an increase in size of a display screen and improvement of luminance of the display screen is desired. In this case, in the liquid crystal display apparatus 20, the discharge tubes 22 are elongated according to the increase in size of the display screen. In addition, for the improvement of luminance of the display screen, a larger number of discharge tubes are provided. In these cases, power consumption of the entire discharge tubes 22 increases. Therefore, a ratio of power consumption by the discharge tubes 22 with respect to power consumption of the entire liquid crystal display apparatus 20 increases.

According to the liquid crystal display apparatus 20 according to one embodiment of the invention, the liquid crystal display apparatus 20 generates AC power for the discharge tubes 22 for lighting a backlight with the AC conversion device 21 and supplies the generated power to the discharge tube 22. In addition, the liquid crystal display apparatus 20 generates DC power with the DC conversion device 23 and supplies the generated power to the respective DC drive devices 24a to 24c. Then, in the liquid crystal display apparatus 20, an AC power supply path 101 for supplying power to the discharge tubes 22 and a DC power supply path 102 for supplying power to the respective DC drive devices 24a to 24c are provided independently.

Since the DC power supply path 102 and the AC power supply path 101 are provided separately, even if power consumption of the liquid crystal display apparatus 20 increases in accordance with an increase in size and an increase in number of the discharge tubes 22, it is possible to prevent power from concentrating on the DC conversion device 23. Therefore, even if power consumption of the discharge tubes 22 increases, it is unnecessary to increase allowable power of the DC conversion device 23 and the respective DC drive devices 24a to 24c, and it is possible to prevent an increase in size of the DC conversion device 23 and the respective DC drive devices 24a to 24c.

Figure 6:
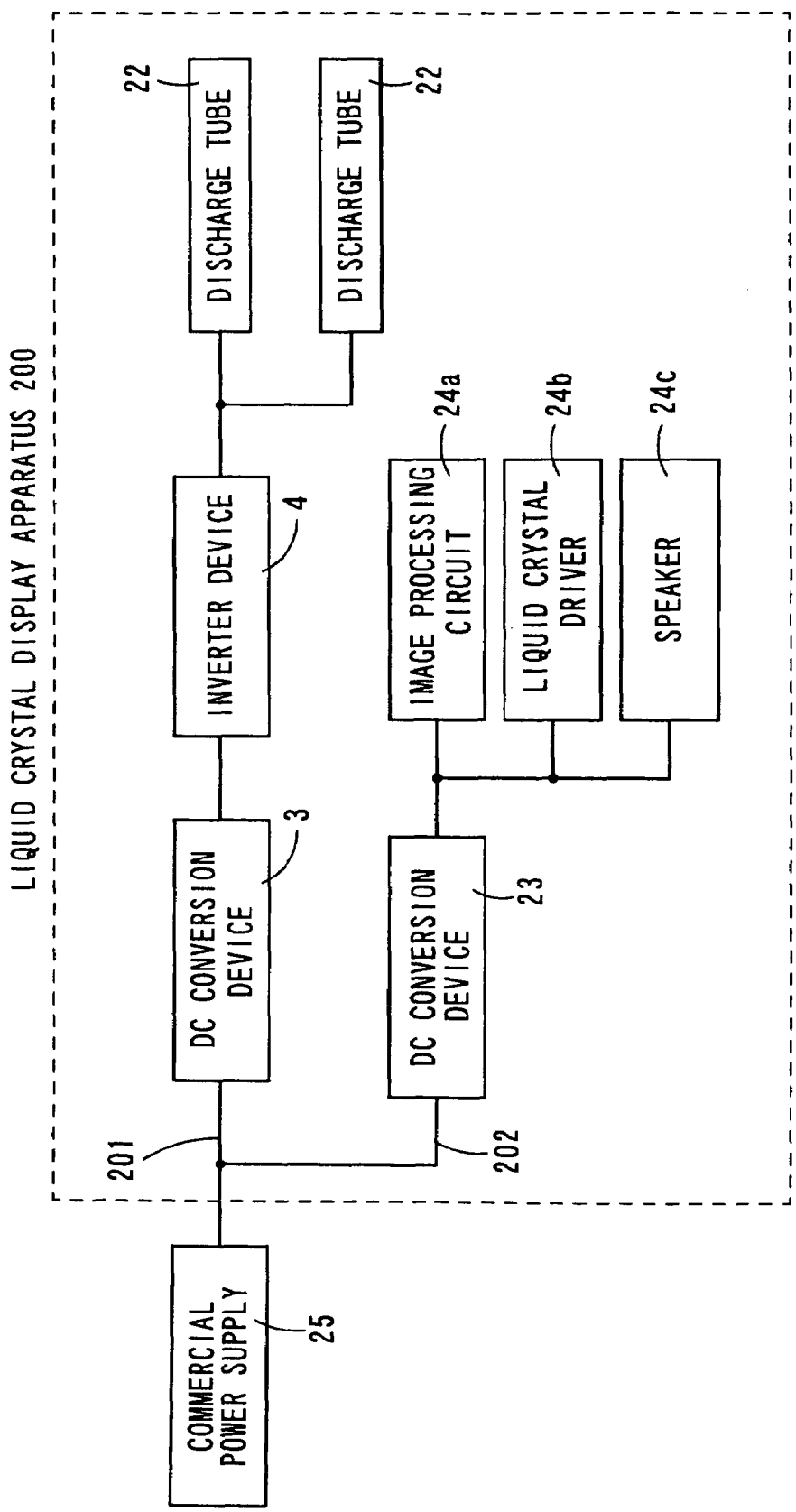
FIG. 6 is a block diagram showing a liquid crystal display apparatus of a comparative example.

FIG. 6 is a block diagram showing a liquid crystal display apparatus 200 of a comparative example. In the liquid crystal display apparatus 200 of the comparative example, a first power supply path 201 for supplying power to the discharge tubes 22 and a second power supply path 202 for supplying power to the respective DC drive devices 24a to 24c are provided independently. In the liquid crystal display apparatus 200 of the comparative example, an electric power system is simply divided into two systems, and the DC conversion device 3 and the inverter device 4, which are the same as those in the related art, are provided in the first power supply path 201. In this case, although it is possible to prevent concentration of power on the DC conversion device 23 of the second power supply path 202, the same problems as those in the related art occur.

Figure 23:
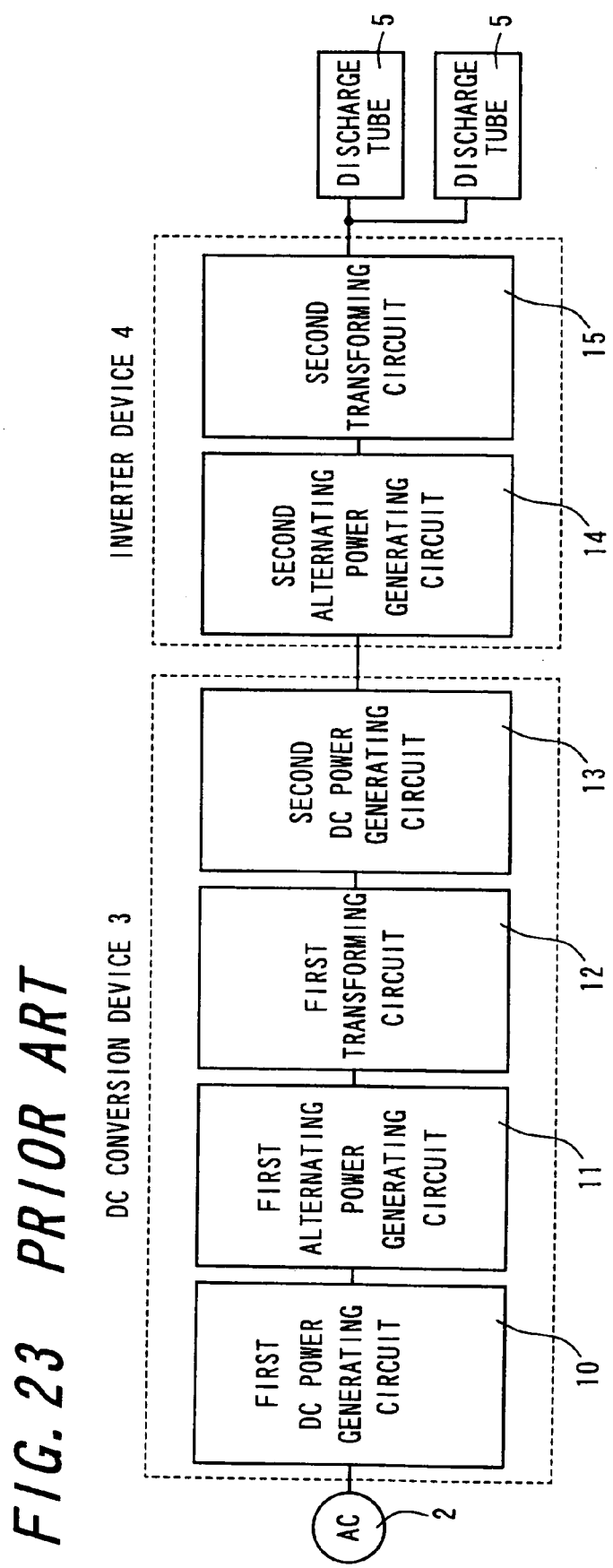
FIG. 23 is a block diagram showing a conventional DC conversion device and a conventional inverter device.

In other words, in the liquid crystal display apparatus 200 of the comparative example, in order to convert AC power given from the commercial power supply 25 into power capable of driving the discharge tubes 22 as shown in FIG. 23, it is necessary to convert the AC power through the first DC power generating circuit 10, the first alternating power generating circuit 11, the first transforming circuit 12, the second DC power generating circuit 13, the second alternating power generating circuit 14, and the second transforming circuit 15. Thus, there are multiple conversion steps and power loss is large. The power loss due to this multiplicity of conversion steps becomes more conspicuous as power consumption of the entire discharge tubes increases.

In the case in which power consumption of the entire discharge tubes 22 increases in accordance with the increase in size and luminance of the display screen, a ratio of power conversion loss related to driving of the discharge tubes with respect to power consumption of the entire liquid crystal display apparatus 20 increases. In the liquid crystal display apparatus 1 of the conventional technique and the liquid crystal display apparatus 200 of the comparative example, power conversion efficiency related to driving of the discharge tubes 22 is low as described above, which is disadvantageous for the increase in size and luminance of the display screen.

On the other hand, in the liquid crystal display apparatus 20 of the invention, as shown in FIG. 2, in order to convert AC power given from the commercial power supply 25 into power capable of driving the discharge tubes 22, the AC power only has to be converted through the first DC power generating circuit 32, the first alternating power generating circuit 33, and the first transforming circuit 34. In other words, the second DC power generating circuit 13 and the second alternating power generating circuit 14 in the conventional liquid crystal display apparatus 1 may be eliminated.

To explain this specifically, in this embodiment, as shown in FIG. 4, the first transformer T1 and the second transformer T2 are directly connected to each other. The first transformer T1 is equivalent to the first transforming circuit 12 of the conventional liquid crystal display apparatus 1 shown in FIG. 23. In addition, the second transformer T2 is equivalent to the second transforming circuit 15 of the conventional liquid crystal display apparatus 1 shown in FIG. 23. In this way, the first transformer T1 and the second transformer T2 are directly connected to drive the second transformer T2 with an AC output of the first transformer T1, whereby it is possible to make a rectifying circuit (second DC power generating circuit 13), which converts the AC output of the first transformer T1 into DC power, unnecessary. In addition, it is possible to make a switching circuit (second alternating power generating circuit 14), which further converts the DC power outputted from a rectifying circuit (second DC power generating circuit 13) into an alternating voltage, unnecessary. Consequently, it is possible to reduce power loss in the drive system and to realize reduction is size and manufacturing cost of the drive system. Note that one composite transformer, in which the first transformer T1 and the second transformer T2 are combined, may be used. As a result, a circuit equivalent to the second transforming circuit 15 of the conventional liquid crystal display apparatus 1 shown in FIG. 23 may be eliminated.

Consequently, in the liquid crystal display apparatus 20 of the invention, it is possible to reduce the number of power conversion steps related to driving of the discharge tubes 22 compared with the related art and to reduce power loss related to power conversion for supplying power to the discharge tubes 22. Note that the liquid crystal display apparatus 20 of the invention is particularly effective in the case in which power consumption of the discharge tubes 22 increases.

In the case in which a drive power for the discharge tubes 22 is set to 70W, when it is assumed that power obtained by subtracting power supplied to the discharge tubes 22 from commercial AC power inputted from the commercial power supply 25 is internal loss power, the internal loss power is about 23W in the liquid crystal display apparatus 200 of the comparative example. On the other hand, the internal loss power is about 15W in the liquid crystal display apparatus 20 of the invention. Therefore, in the liquid crystal display apparatus 20 of the invention, it is possible to realize reduction in lost power of 8W compared with the liquid crystal display apparatus 200 of the comparative example. For example, in a television having a large-sized liquid crystal monitor, drive power for the discharge tubes 22 is 60 to 100W or more, and it is possible to attain the advantages of the invention sufficiently.

In addition, since the circuits 13, 14, and 15 may be eliminated compared with the liquid crystal display apparatus 200 of the comparative example, it is possible to reduce the number of components. Consequently, it is possible to reduce the number of semiconductor power devices significantly, which contributes to inexpensive manufacturing of the liquid crystal display apparatus 20 and reduction is size of the liquid crystal display apparatus 20.

In addition, in the liquid crystal display apparatus 20, the respective power supply paths 101 and 102 are divided into two systems, whereby it is possible to prevent concentration of power on the DC conversion device 23 and to control heat generation of the DC converting device 23. In addition, it is possible to control heat generation of the AC conversion device 21 through improvement of conversion efficiency of the AC conversion apparatus 21, that is, reduction in conversion loss. Consequently, it is possible to prevent damage to the liquid crystal display apparatus 20 caused by heat generation of the AC conversion device 21 and the DC conversion device 23 and to improve reliability.

The liquid crystal monitor included in the liquid crystal display device 20 is called a flat panel display depending on a case. In this case, it is desired that the display screen is formed with reduced thickness in addition to the increase in size. In the case in which thickness of the liquid crystal display apparatus 20 is reduced, an internal space thereof is narrowed. Therefore, convection of heat in the internal space decreases, and arrangement positions for the AC conversion device 21 and the DC conversion device 23 are limited. In the invention, even in the case in which the respective conversion devices 21 and 23 are arranged in positions relatively close to the other drive devices, it is possible to control heat generation amounts of the respective conversion devices 21 and 23 as described above. Therefore, it is possible to prevent malfunction of the other drive devices due to the heat generation of the respective conversion devices 21 and 23 effectively.

Figure 21:
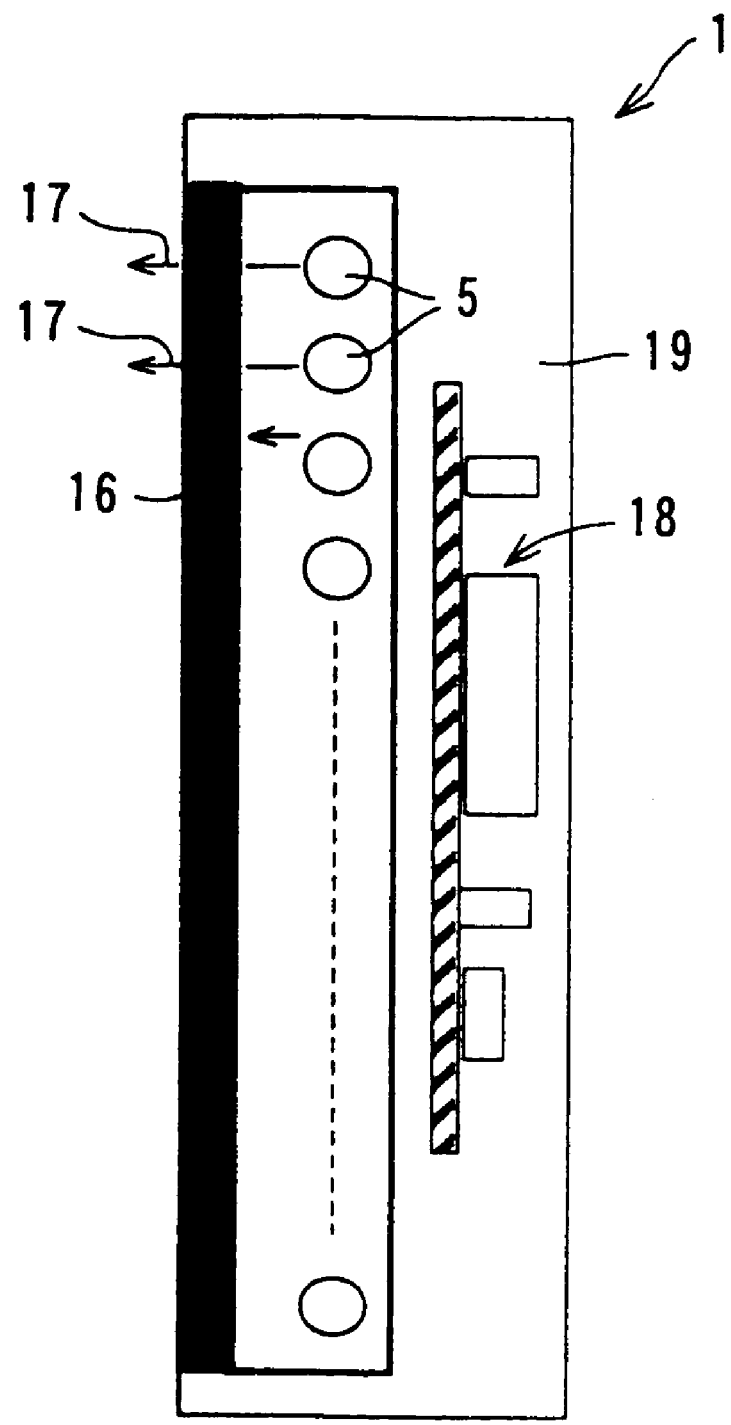
FIG. 21 is a sectional view showing a conventional liquid crystal display apparatus.
Figure 22:
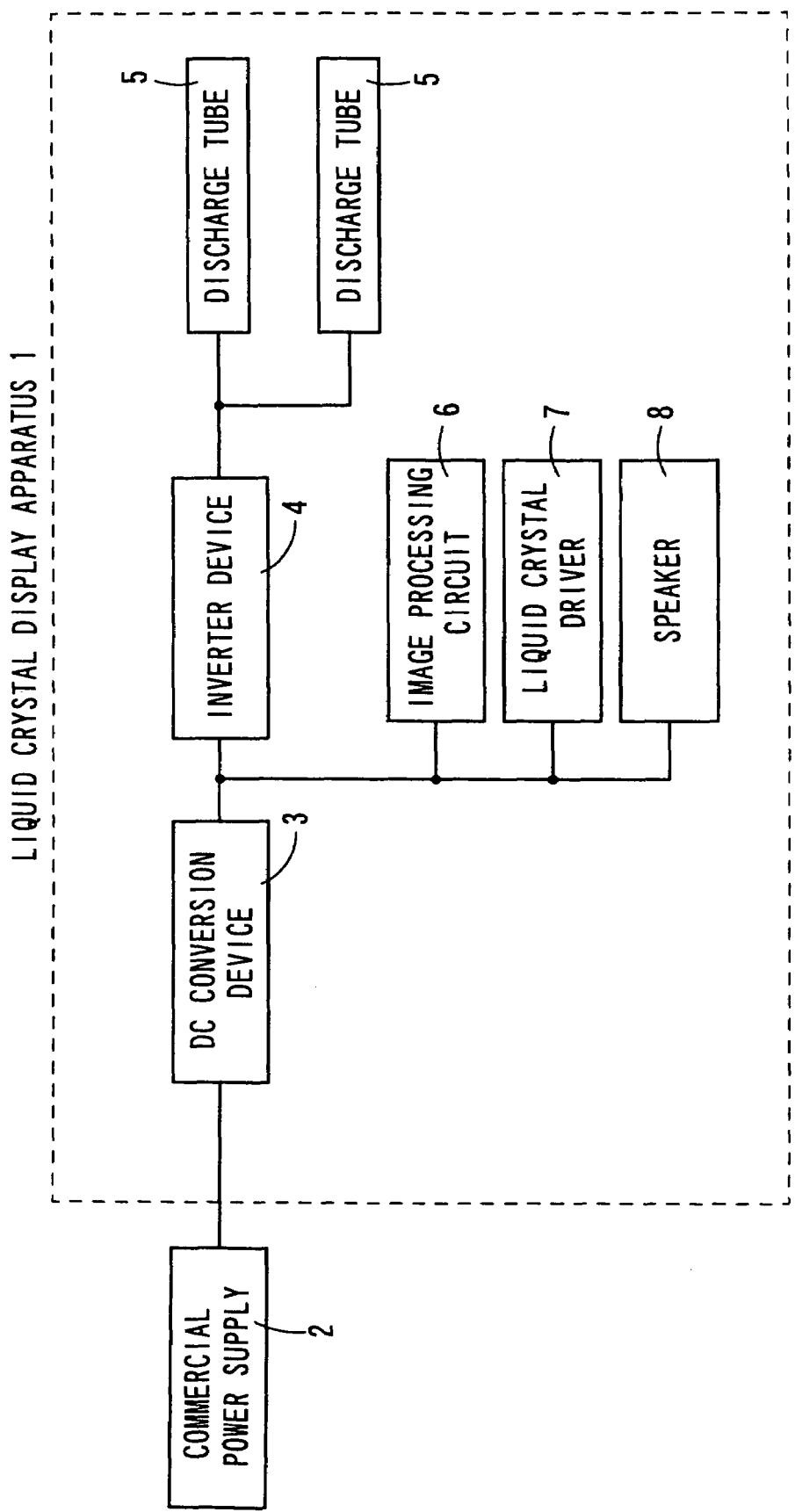
FIG. 22 is a block diagram showing the conventional liquid crystal display apparatus.

For example, in the case in which plural cold cathode discharge tubes are arranged on the back of a liquid crystal display substrate in a backlight structure in which a backlight is provided directly under the substrate as shown in FIG. 21 for the purpose of increasing a size and luminance of a liquid crystal display, heat generated by a cold cathode discharge tube is conducted to a metal chassis, and temperature in an internal space of a liquid crystal display apparatus increases. Consequently, the AC conversion device 21 of the invention is used in severe temperature environments. Heat loss of the cold cathode discharge tubes is large. For example, it is said that a cathode fall voltage is rather large compared with that in a hot cathode discharge tube and is 100 Vrms to 150 Vrms. Several mA of tube current flows at this cathode fall voltage to cause electrode loss. Power loss obtained by multiplying this electrode loss by the number of cold cathode discharge tubes is loss of the entire discharge tubes. In the invention, the AC conversion device 21 is reduced in size, whereby convection of heat in the internal space is increased as much as possible to reduce temperature rise due to the cold cathode discharge tubes.

In this embodiment, as shown in FIGS. 4 and 5, the first DC power generating circuit 32 and the second DC power generating circuit 35 are realized by the same circuit structure. In addition, the first alternating power generating circuit 33 and the second alternating power generating circuit 36 are realized by the same circuit structure. In addition, the first transformer T1 and the third transformer T4 are realized by the same circuit structure. The first DC power generating circuit 32 and the second DC power generating circuit 35 are provided in separately, whereby it is possible to disperse heat generation sources of the liquid crystal display apparatus 20. Consequently, even in the case in which power given to the liquid crystal display apparatus 20 is large, it is possible to prevent deficiency due to heat generation.

In other words, in the AC conversion device 21, the same circuit components as those in the DC conversion device 23 are present. Therefore, it is possible to constitute a part of the AC conversion device 21 by diverting the circuit components of the DC conversion device 23. Consequently, it is possible to reduce manufacturing cost and to simplify inventory management for circuit components constituting the AC conversion device 21 and the DC conversion device 23.

It is possible to realize a composite circuit composed of the first DC power generating circuit 32, the fist alternating power generating circuit 33, and the first transformer T1 by remaining circuit components excluding a part of circuit components of the switching power supply circuit. In addition, the DC conversion device 23 can also be realized by the existing switching power supply circuit. Consequently, it is possible to realize the liquid crystal display apparatus 20 of the invention easily.

Note that it is explained that the first DC power generating circuit 32 and the second DC power generating circuit 35 mentioned above are realized by the same circuit structure. However, the first DC power generating circuit 32 and the second DC power generating circuit 35 may be different circuit structure from each other according to applications thereof. In addition, as described later, one circuit may be used as both the first DC power generating circuit 32 and the second DC power generating circuit 35. Similarly, the first alternating power generating circuit 33 and the second alternating power generating circuit 36 may be realized by the same circuit structure, and may be realized by different circuit structures according to applications thereof.

The capacitors for preventing DC superimposition 72 are connected to the branched parts 66a and 66b in the fifth line 66 in series. Consequently, a DC component of a current flowing in the primary windings 67 of second transformers T2 and T3 is removed. Further, it is possible to prevent DC superimposition from occurring in the second transformers T2 and T3. Consequently, even in the case in which there is a bias in a positive side waveform and a negative side waveform of waveforms of AC power generated by the first alternating power generating circuit 33, it is possible to prevent a bias from occurring in magnetic flux densities of the second transformers T2 and T3. As a result, it is possible to prevent magnetic saturation of the second transformers T2 and T3 and prevent an excess current from flowing in the respective circuits constituting the liquid crystal display apparatus 20.

Consequently, it is possible to prevent damage to the liquid crystal display apparatus 20 and improve reliability. Note that, in this embodiment, the capacitors for preventing DC superimposition 72 are provided in the second transformers T2 and T3. However, a capacitor for preventing DC superimposition for removing a DC component of a current flowing in the primary winding 61 of the first transformer T1 may be provided.

The leakage inductances 73a are provided in the secondary windings 73 of the second transformers T2 and T3. Consequently, in the voltage converting unit 31, an L.C series resonance circuit is constituted by the leakage inductances 73a and the capacitors for waveform rectification 80. In other words, low-pass filter circuit parts are constituted. Consequently, it is possible to attenuate a harmonic component of a current flowing in the seventh line 75 and the eighth line 78. Moreover, an electrostatic capacity of the capacitors 80 and an inductance value of the secondary windings 73 are set appropriately, whereby, even if the first alternating power generating circuit 33 outputs power of a rectangular waveform, it is possible to bring a waveform of an AC voltage given to the discharge tubes 22 close to a sine waveform. In addition, actually, parasitic capacities are present between the respective discharge tubes 22 and adjacent conductors. Therefore, even if the second connection lines 28 and the capacitors for waveform rectification are not provided, low-pass filters may be realized by the parasitic capacities and the leakage inductances 73a.

The discharge tubes 22 are driven stably as AC voltage of a sine waveform is applied thereto. Therefore, the low-pass filters are constituted closer to the discharge tubes 22 as described above. Consequently, even if a harmonic component is superimposed from the first alternating power generating circuit 33 to the discharge tubes 22 and even if the first alternating power generating circuit 33 outputs alternating power of a rectangular waveform, it is possible to stabilize operations of the discharge tubes 22.

In addition, in the first DC power generating circuit 32, it is preferable to convert AC power into DC power of a voltage as high as possible, as long as the voltage does not exceed allowable withstand voltage values of the first alternating power generating circuit 33 and the voltage converting unit 31. Consequently, it is possible to reduce a current flowing in the first alternating power generating circuit 33 and the voltage converting unit 31 and to lower an allowable current of the first DC power generating circuit 32 in order to give drive power to be set to the discharge tubes 22. It is possible to control heat generation of the respective circuit by reducing a current flowing thereto. In addition, as shown in FIG. 4, it is possible to give power to the plurality of discharge tubes 22 with one first alternating power generating circuit 33 and to reduce the number of circuit components to manufacture the circuit inexpensively.

After converting the commercial AC power into the high-frequency power with the frequency converting unit 30, the AC conversion device 21 of this embodiment transforms a voltage of the high-frequency AC power, which is converted by the frequency converting unit 30, with the voltage converting unit 31. The commercial AC power is converted into power of a target frequency and a target voltage in this order, whereby it is possible to reduce a size of the first transformer T1.

More specifically, a magnetic flux density, which occurs in the case in which an alternating voltage is applied to a primary winding of a transformer, is represented by the following expression.

$$n \geq V_{in} \times T_{on} \times 10^9 / (2 \times S \times \Delta B_m)$$

Note that n indicates the number of windings of the primary winding, $V_{in}$ indicates an alternating voltage given to the primary winding, $T_{on}$ indicates a winding conduction time, S indicates a cross section area of a core, and $\Delta B_m$ indicates a magnetic flux density.

From the expression, it is assumed that the cross section area S of the core and the magnetic flux density $\Delta B_m$ are constant. When the winding conduction time $T_{on}$ is large, that is, when a frequency of the alternating voltage is low, the expression means that it is necessary to increase the number of windings n, and a transformer is increased in size. In addition, when the winding conduction time $T_{on}$ is reduced, that is, when a frequency of the alternating voltage is increased, only a small number of windings n is required, and it is possible to reduce a size of the transformer.

Therefore, the first transformer T1 is driven at several tens of kilohertz, which is higher than the commercial frequency 50 to 60 Hz by three orders, whereby it is possible to reduce the number of windings n, the core cross section area S, and the magnetic flux density $\Delta B_m$ and to realize reduction in size of the first transformer T1. In addition, commercial AC power is temporarily converted into DC power, whereby it is possible to convert a frequency of the commercial AC power into a higher frequency of several tens of kilohertz easily. If possible, after transforming a voltage of the commercial AC power with the voltage converting unit 31, a frequency of the transformed AC voltage may be converted by the frequency converting unit 30.

Figure 7:
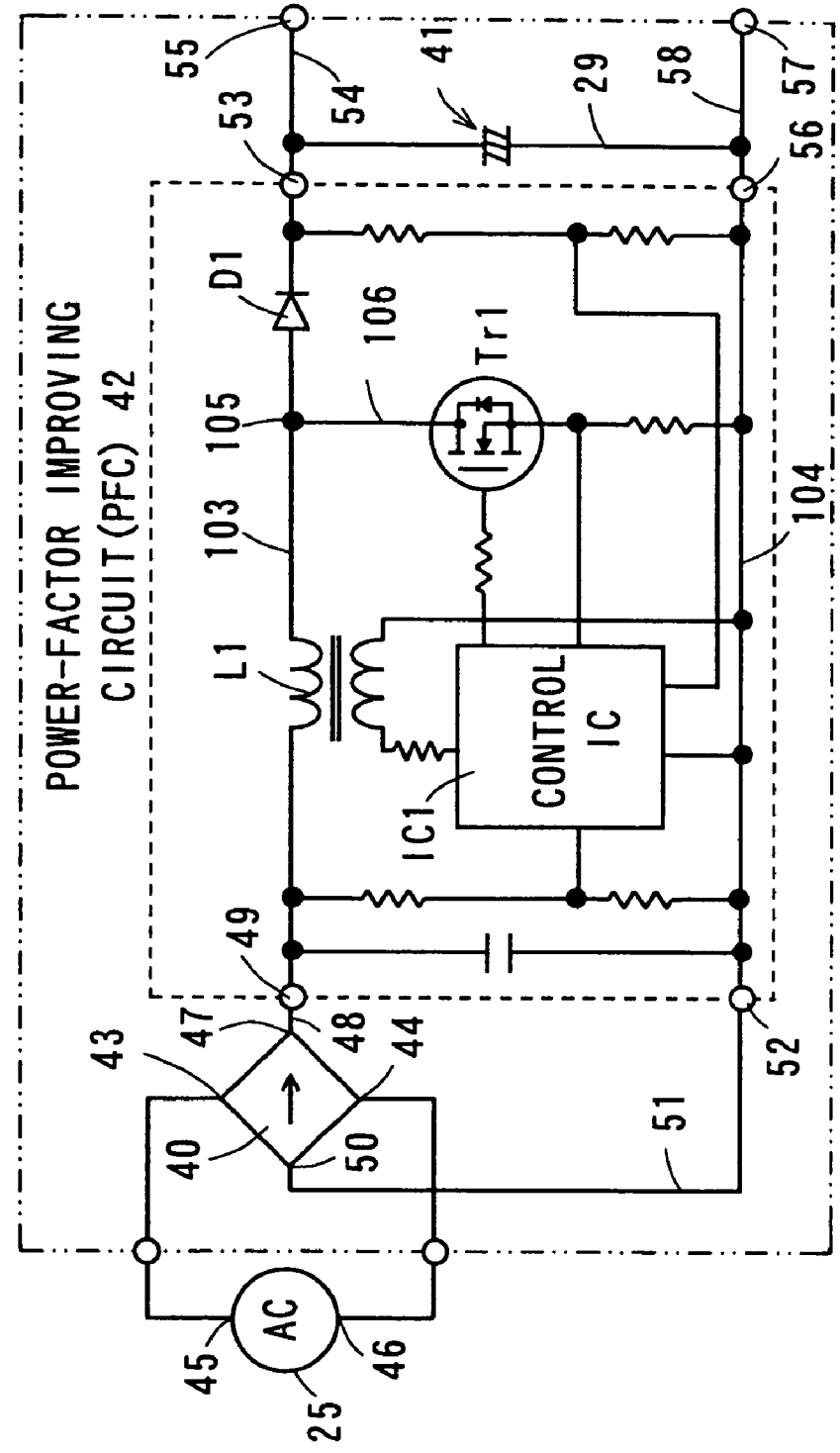
FIG. 7 is a circuit diagram showing an example of a first DC power generating circuit.
Figure 8:
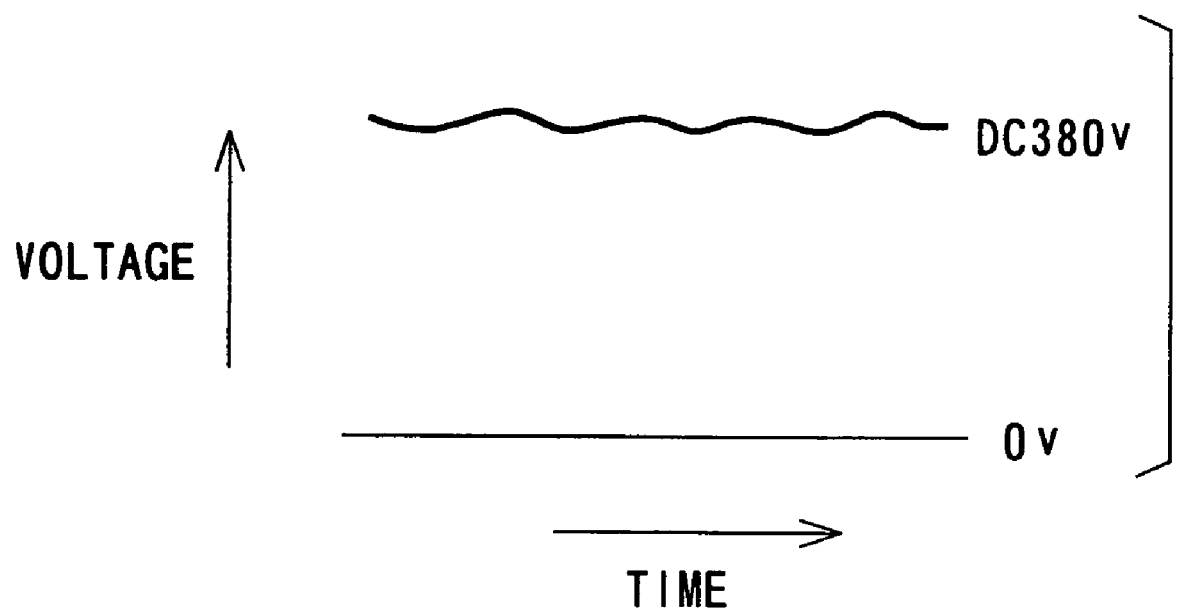
FIG. 8 is a graph showing an output voltage waveform of the first DC power generating circuit.

FIG. 7 is a circuit diagram showing an example of the first DC power generating circuit 32. In addition, FIG. 8 is a graph showing an output voltage waveform of the first DC power generating circuit 32. The first DC power generating circuit 32 includes the rectifier 40, the power-factor improving circuit 42, and the smoothing filter 41 to constitute an active filter circuit. The active filter circuit can improve a power factor and reduce a harmonic current. Moreover, the active filter circuit shown in FIG. 7 has a function of stabilizing an output voltage of output power to be outputted even if a voltage of input power to be given fluctuates.

More specifically, the active filter circuit has a boosting chopper function. As shown in FIG. 7, the boosting chopper circuit includes the smoothing capacitor 41, an inductor L1, a diode D1, a switching element Tr1, and a control IC (Integrated Circuit) IC1. In the boosting chopper circuit, an ON/OFF ratio of the switching element Tr1 is adjusted by the control IC IC1. In this embodiment, the switching element Tr1 is realized by an MOS (Metal Oxide Semiconductor) field effect transistor and a feedback diode connected to the transistor in inverse-parallel.

The power-factor improving circuit 42 has an eleventh line 103, which connects one input terminal 49 and one output terminal 53, and a twelfth line 104, which connects the other input terminal 52 and the other output terminal 56. The inductor L1 is connected to the eleventh line 103 in series. In addition, the diode D1 is connected to the eleventh line 103 in series in a part closer to one output terminal 53 than the inductor L1.

In the eleventh line 103, a connection point 105 is provided between the inductor L1 and the diode D1. The power-factor improving circuit 42 has a thirteenth line 106 that connects the connection point 105 of the eleventh line 103 and the twelfth line 104. The switching element Tr1 is interposed in the thirteenth line 106. In an ON state, the switching element Tr1 brings the thirteenth line 106 into a connected state to short-circuit the eleventh line 104 and the twelfth line 105. In addition, in an OFF state, the switching element Tr1 brings the thirteenth line 106 into a blocked state to open the eleventh line 104 and the twelfth line 105.

The control IC IC1 adjust the ON/OFF ratio of the switching element Tr1 on the basis of a waveform of a current flowing to the inductor L1. Consequently, the active filter circuit can make the waveform of the current flowing to the inductor L1 similar to an output voltage waveform of the rectifier 40 and can adjust a power factor of the first DC power generating circuit 32 to substantially one.

The power factor is adjusted to substantially one, whereby the commercial AC power supply does not require an excess supply capability exceeding power consumption of the liquid crystal display apparatus 20 in order to drive the liquid crystal display apparatus 20. Therefore, the AC power supply only has to have a supply capability for supplying AC power suitable for the power consumption of the liquid crystal display apparatus 20. Consequently, the liquid crystal display apparatus 20 can use even an AC power supply with a low power supply capability as a power supply source.

In the case in which a power-factor improving circuit is not provided, a power factor is low at about 0.5 to 0.6. In this case, harmonic distortion may occur in a power transmission system of the commercial power supply, and a failure may occur in the power transmission system. Therefore, countries tend to set up regulations for improving a power factor in order to prevent a failure from occurring in the power transmission system. In Japan, voluntary control is performed on the basis of Guideline for the Appliance General-Purpose Harmonic Control issued by Agency for Natural Resources and Energy of the Ministry of Economy, Trade and Industry. In addition, in Europe, a safety standard such as IEC1000-3-2 (International Electrotechnical Commission) is announced.

As shown in FIG. 7, the control IC IC1 adjusts the ON/OFF ratio of the switching element Tr1 on the basis of a potential difference between the two output terminals 53 and 56 of the first DC voltage generating circuit 32. Consequently, even in the case in which a voltage fluctuates in a given AC power, the active filter circuit can output stable power. As shown in FIG. 8, for example, even if an effective value of a commercial voltage fluctuates at 100 to 240 Vrms, the active filter circuit can maintain a voltage of a DC current, which is outputted from the first DC voltage generating circuit 32 and given to the first alternating power generating circuit 33, at 380V. Note that it is possible to set a voltage, which the active filter circuit is capable of outputting, arbitrarily as long as the voltage is equal to or larger than a square root of an inputted commercial power supply voltage (commercial power supply voltage×$\sqrt{2}$).

In this way, since the power-factor improving circuit 42 is also provided with the function of stabilizing power given to the first alternating power generating circuit 33 even if supplied alternating power fluctuates, it is possible to reduce control burden on the first alternating power generating circuit 33.

Figure 9:
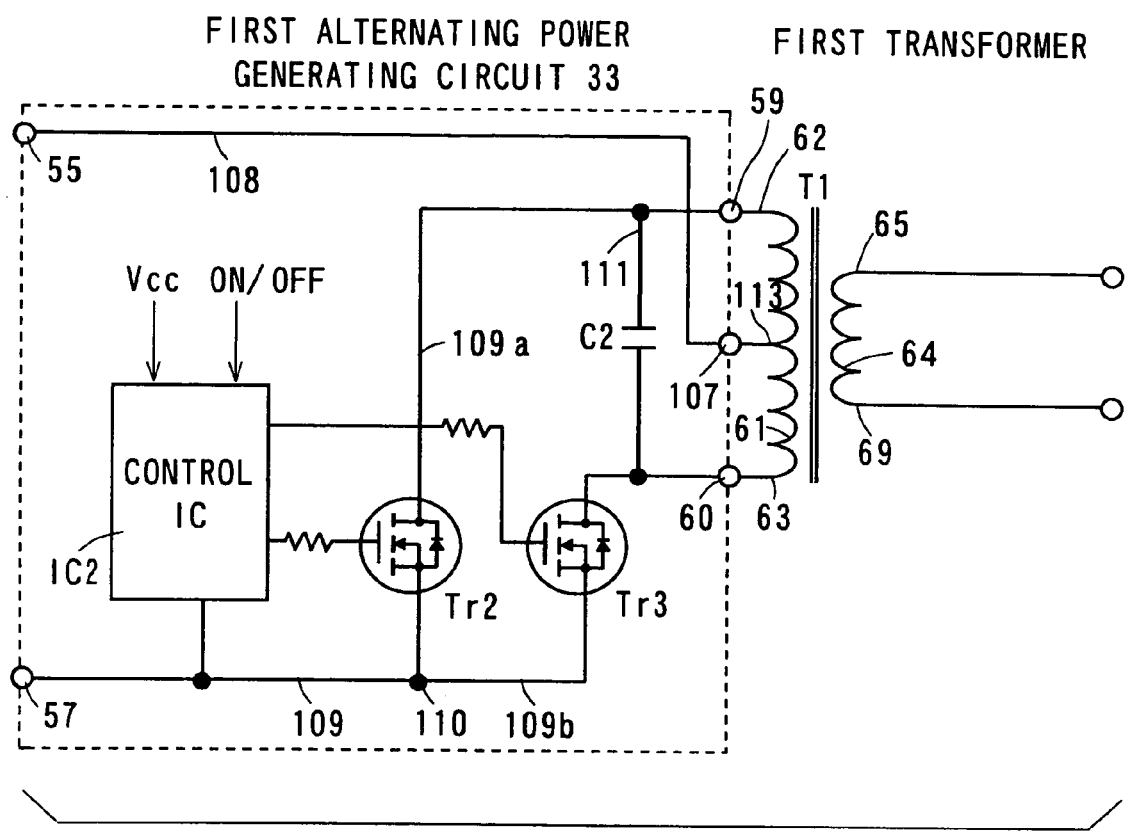
FIG. 9 is a circuit diagram showing an example of a first alternating power generating circuit.
Figure 10:
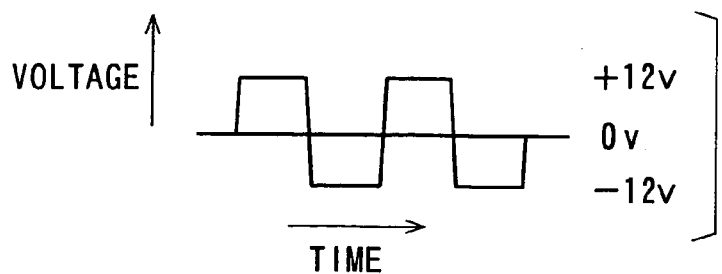
FIG. 10 is a graph showing an output voltage waveform of a first transformer.

FIG. 9 is a circuit diagram showing an example of the first alternating power generating circuit 33. In addition, FIG. 10 is a graph showing an output voltage waveform of the first transformer T1. The first alternating power generating circuit 33 includes a capacitor C2, two switching elements Tr2 and Tr3, and a control IC IC2 to realize a push-pull type AC converting circuit. In this embodiment, the two switching elements Tr2 and Tr3 are realized by an enhancement type MOS transistor and a feedback diode connected to the transistor in inverse-parallel. The first alternating power generating circuit 33 is a self-excited inverter circuit that has a commutation capability in itself and is capable of generating an alternating current having an arbitrary frequency.

The first alternating power generating circuit 33 has a center tap formed therein and has two input terminals 55 and 57, two both-end output terminals 59 and 60, and a center output terminal 107. The first alternating power generating circuit 33 has a fourteenth line 108, which connects one input terminal 55 and the center output terminal 107, and a fifteenth line 109, which connects the other input terminal 57 and the two both-end output terminals 59 and 60. In the fifteenth line 109, a branching point 110 is formed, and branched parts 109a and 109b branched into two from the branching point 110 are formed. One branched part 109a is connected to one both-end output terminal 59 of the both-end output terminals 59 and 60, and the other branched part 109b is connected to the other both-end output terminal 60 of the both-end output terminals 59 and 60.

The switching elements Tr2 and Tr3 are connected to the respective branched parts 109a and 109b of the fifteenth line 109 in series. In an ON state, one switching element Tr2 brings the corresponding branched part 109a of the fifteenth line 109 into a connected state to short-circuit the other input terminal 57 and one both-end output terminal 59 connected to the branched parts 109a. In an OFF state, one switching element Tr2 brings the corresponding branched part 109a of the fifteenth line 109 into a blocked state to open the other input terminal 57 and one both-end output terminal 59 connected to the branched part 109a. The same holds true for the other switching element Tr3. That is, In an ON state, the other switching element Tr3 brings the corresponding branched part 109b of the fifteenth line 109 into a connected state to short-circuit the other input terminal 57 and the other both-end output terminal 60 connected to the branched parts 109b. In an OFF state, the other switching element Tr3 brings the corresponding branched part 109b of the fifteenth line 109 into a blocked state to open the other input terminal 57 and the other both-end output terminal 60 connected to the branched part 109b.

The first alternating power generating circuit 33 has a fourth connection line 111 that connects the branched parts 109a and 109b of the fifteenth line 109 in a position closer to the output terminal than the respective switching elements Tr2 and Tr3. The capacitor C2 is interposed in the fourth connection line 111 and is connected to the fourth connection line 111 in series. The control IC IC2 associates the two switching elements Tr2 and Tr3 with each other to adjust an ON/OFF ratio thereof such that a predetermined frequency is obtained. When the control IC IC2 brings one of the two switching elements Tr2 and Tr3 into an ON state, the control IC IC2 brings the other into an OFF state. Note that the control IC IC1 for power-factor improving circuit and the control IC IC2 for the first alternating power generating circuit are provided independently from each other.

In the case in which such a first alternating power generating circuit 33 is used, the primary winding 61 of the first transformer T1 has the two both-end input terminals 62 and 63 and a center input terminal 113. The both-end input terminals 62 and 63 of the primary winding 61 are connected to both ends of the coil-like portion, and the center input terminal 113 is connected to substantially the middle part of the coil-like portion.

One both-end input terminal 62 of the both-end input terminals 62 and 63 of the primary winding 61 is connected to one both-end output terminal 59 of the both-end output terminals 59 and 60 of the first alternating power generating circuit 33. In addition, the other both-end input terminal 63 of the both-end input terminals 62 and 63 of the primary winding 61 is connected to the other both-end output terminal 60 of the both-end output terminals 59 and 60 of the first alternating power generating circuit 33. In addition, the center input terminal 113 of the first transformer T1 is connected to the center output terminal 107 of the first alternating power generating circuit 33.

The control IC IC2 alternately switches the ON/OFF state of the two switching elements Tr2 and Tr3, whereby a current alternately flows to the branched parts 109a and 109b of the fifteenth line 109 to switch a direction of a current flowing in the primary winding 61 of the first transformer T1. The control IC IC2 switches the ON/OFF state of the respective switching elements Tr2 and Tr3 at a predetermined period, whereby it is possible to give an alternating current to the winding 61 of the first transformer T1. In addition, DC power of a voltage higher than the commercial AC voltage is switched, whereby it is possible to reduce a current flowing in the first alternating power generating circuit 33 and to reduce power loss in the first alternating power generating circuit 33.

The first alternating power generating circuit 33 is given DC power of a high voltage, for example, 380V outputted by the first DC power generating circuit 32 and converts the DC power into high-frequency AC power. Power boosted to be higher than the commercial AC power is given to the first alternating power generating circuit 33. Therefore, the first alternating power generating circuit 33 is required of a high withstand voltage performance capable of switching DC several hundreds of volts.

In this embodiment, DC voltage of 140V to 380V is given to the first alternating power generating circuit 33 from the first DC power generating circuit 32. Therefore, the first alternating power generating circuit 33 is required of a withstand voltage performance of 500V to 700V. In addition, in this embodiment, the first alternating power generating circuit 33 converts DC power into AC power of a frequency equal to or higher than 35 kHz and equal to or lower than 70 kHz, for example, 40 kHz in order to keep stable lighting of the discharge tubes 22 and satisfactory liquid crystal image quality.

A voltage waveform of AC power outputted from the first alternating power generating circuit 33 is a rectangular waveform. The first transformer T1 drops AC power given from the first alternating power generating circuit 33 to be 0.035 to 0.07 times as large. Consequently, as shown in FIG. 10, a voltage waveform of power outputted from the first transformer T1 is an alternating waveform of 12 to 40 V0-P, for example, a rectangular waveform alternating at 12V and −12V. Then, the first transformer T1 gives a transformed voltage to the second transformers T2 and T3.

The first transformer T1 is designed in accordance with the predetermined safety standard as described above. For example, an electric insulating function between a primary winding and a secondary winding is required to comply with criteria defined in safety standards such as UL1950 (Underwriters Laboratories Inc.) in the United States, the Electric Appliances and Material Safety Law in Japan, and IEC950 (International Electrotechnical Commission) in the international standard. The first transformer T1 is required to have a structure satisfying a space distance, a creepage distance, and an insulating withstand voltage test in accordance with these standards. This is for the purpose of preventing a human body from an electric shock accident of a commercial power supply and preventing an earth faulting accident due to leakage. In this way, the first transformer T1 is required of the important safety structure.

For example, a withstand voltage performance under the safety standard is 1000V to 1200V in Japan and may be 4400V in foreign countries. In the invention, it is possible to use the same transformer as the third transformer T4 of the DC converting device 23 as the first transformer T1.

The second transformers T2 and T3 boost a voltage of power outputted from the first transformer T1 to be 42 to 84 times as high to generate AC power of a voltage capable of driving the discharge tubes 22, for example, an effective value of 1000 Vrms. Then, the second transformers T2 and T3 give the boosted power to the discharge tubes 22. Since the second transformers T2 and T3 are provided on the secondary side, which has already been electrically insulated from the commercial power supply by the first transformer T1, the second transformers T2 and T3 are not required of the insulating structure of the like under the safety standard required of the first transformer T1. However, since a voltage given to the secondary windings of the second transformers T2 and T3 is 1000 Vrms to 1500 Vrms, the second transformers T2 and T3 are set to have a withstand voltage structure capable of resisting a functional failure, deterioration, and the like due to electric discharge.

Note that, as described above, it is possible to realize the first DC power generating circuit 32, the first alternating power generating circuit 33, and the first transformer T1 by remaining components excluding a part of components of the switching power supply circuit. Therefore, the first DC power generating circuit 32, the first alternating power generating circuit 33, and the first transformer T1 are manufactured using the switching power supply circuit that has already been put to practical use, whereby it is possible to manufacture the first DC power generating circuit 32, the first alternating power generating circuit 33, and the first transformer T1 as one unit. Since the first transformer T1 is diverted from the existing switching power supply circuit in this way, it is possible to make the liquid crystal display apparatus 20 to comply with the safety standard and obtain the liquid crystal display apparatus 20 inexpensively.

In addition, a voltage is dropped by the first transformer T1 in order to drop the voltage to be equal to or lower than a safe voltage under the safety standard. Therefore, in the case in which it is possible to comply with the safety standard according to some method, the voltage converting unit 31 may give the boosted power to the discharge tubes 22 directly from the first transformer T1 without providing the second transformers T2 and T3.

Figure 14:
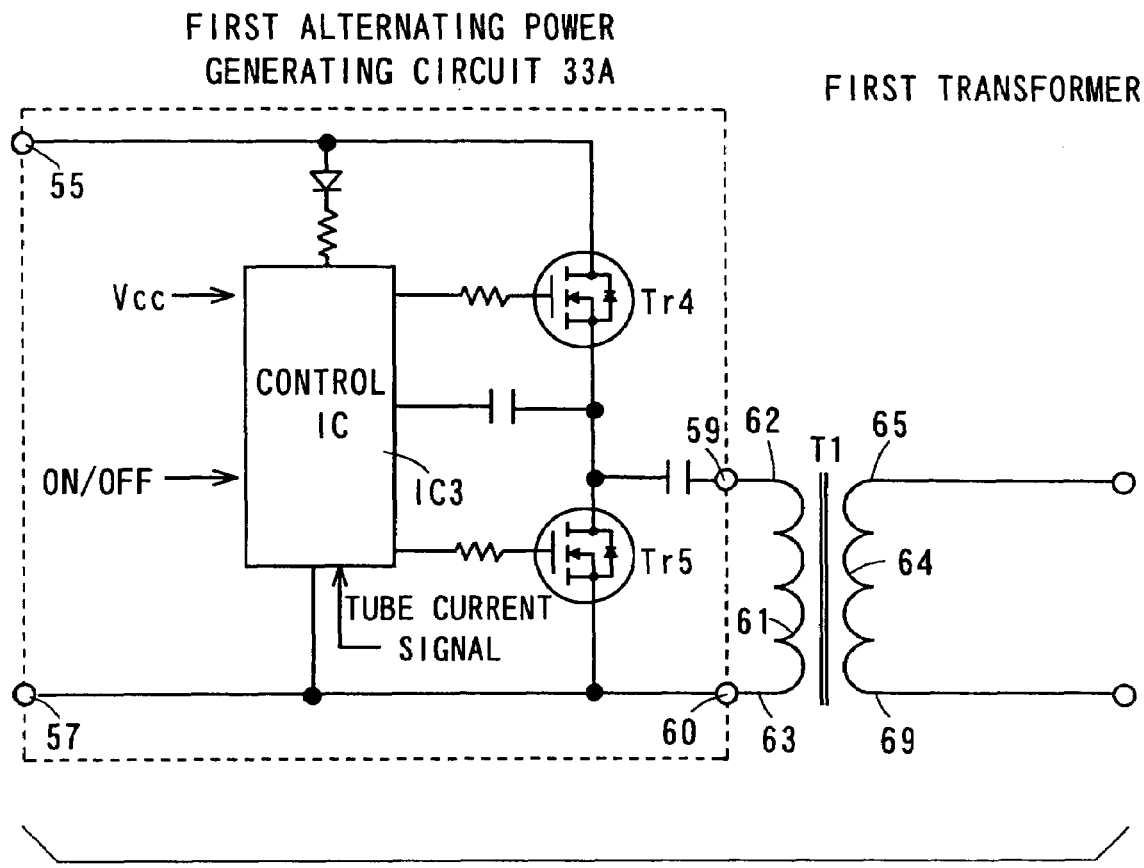
FIG. 14 is a circuit diagram showing a first alternating power generating circuit according to still another embodiment of the invention.
Figure 16:
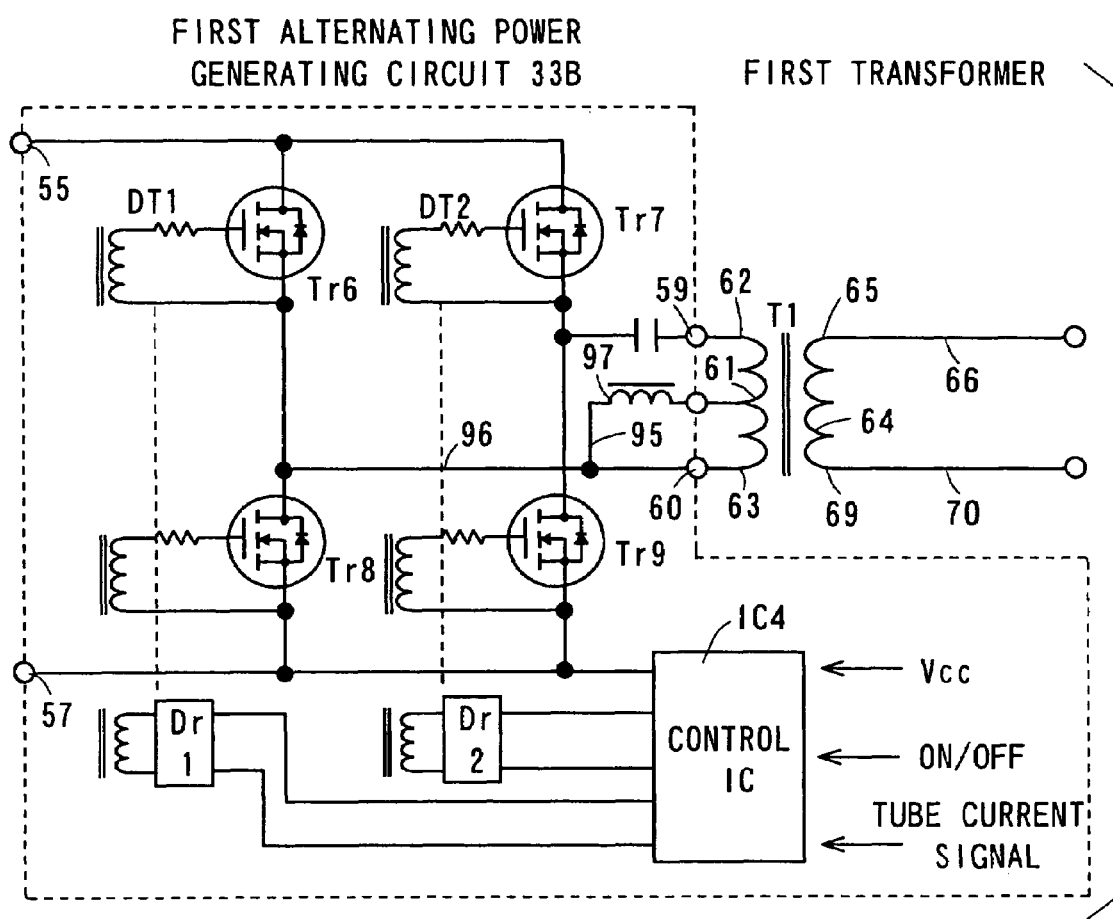
FIG. 16 is a circuit diagram showing a first alternating power generating circuit according to still another embodiment of the invention.

In addition, the circuit structure of the liquid crystal display apparatus 20 of the invention described above is an example of the invention and may be realized by an equivalent circuit having the same functions. For example, the AC conversion device 21 and the DC conversion device 23 are realized by the similar structures for reducing the number of components. However, a circuit structure of the AC conversion device 21 may be changed from that of the DC conversion device 23 significantly. For example, FIGS. 9, 14, and 16 show alternating power generating circuits 33, 33A, and 33B having different circuit structures, respectively. However, the first alternating power generating circuit 33 and the second alternating power generating circuit 36 may be realized by different circuit structures.

In addition, the AC conversion device 21 of this embodiment has the power-factor improving circuit 42, the capacitors for preventing DC superimposition 72, and the capacitors for waveform rectification 80. However, these are not components essential for the invention and may not be provided. In this case, the two output terminals 47 and 50 of the rectifier 40 are directly connected to the two input terminals 55 and 57 of the second alternating power generating circuit 36.

Although the two discharge tubes 22 are shown in FIG. 1 and the like, the number of the discharge tubes 22 is not limited. Therefore, two or more discharge tubes 22 may be connected to one first alternating power generating circuit 33 in a range allowed by the power supply capability of the first alternating power generating circuit 33. A plurality of AC conversion devices 21 may be provided with respect to one liquid crystal display apparatus 20. The AC converting device 21 of the invention includes only one pair of at least the first DC power generating circuit 32 and the first alternating power generating circuit 33, and components other than the first DC power generating circuit 32 and the first alternating power generating circuit 33 included in the AC conversion device 21 are not limited.

Although wiring connecting terminals are referred to as a line and explained in this embodiment, elements may be connected to each other directly without the intervention of the line. In addition, the image processing circuit 24a, the liquid crystal driver 24b, and the speaker 24c are shown as the examples of the DC drive devices 24. However, the DC drive devices 24 are not limited to these and may be other devices.

In this embodiment, the first DC power generating circuit 32 of the AC conversion device 21 and the second DC power generating circuit 35 of the DC conversion device 23 are provided independently from each other. The respective DC power generating circuits 32 and 35 include a full-wave rectifying circuit and a PFC circuit. As another embodiment of the invention, a DC power generating circuit may be commonly used as the first DC power generating circuit 32 and the second DC power generating circuit 35. In this case, the first alternating power generating circuit 33 and the second alternating power generating circuit 36 are connected to the commonly used DC power generating circuit in parallel, respectively. In other words, respective output terminals of the commonly used DC power generating circuit are connected to the respective input terminals of the first alternating power generating circuit 33 and the second alternating power generating circuit 36. Consequently, it is possible to further reduce the number of components.

Figure 11:
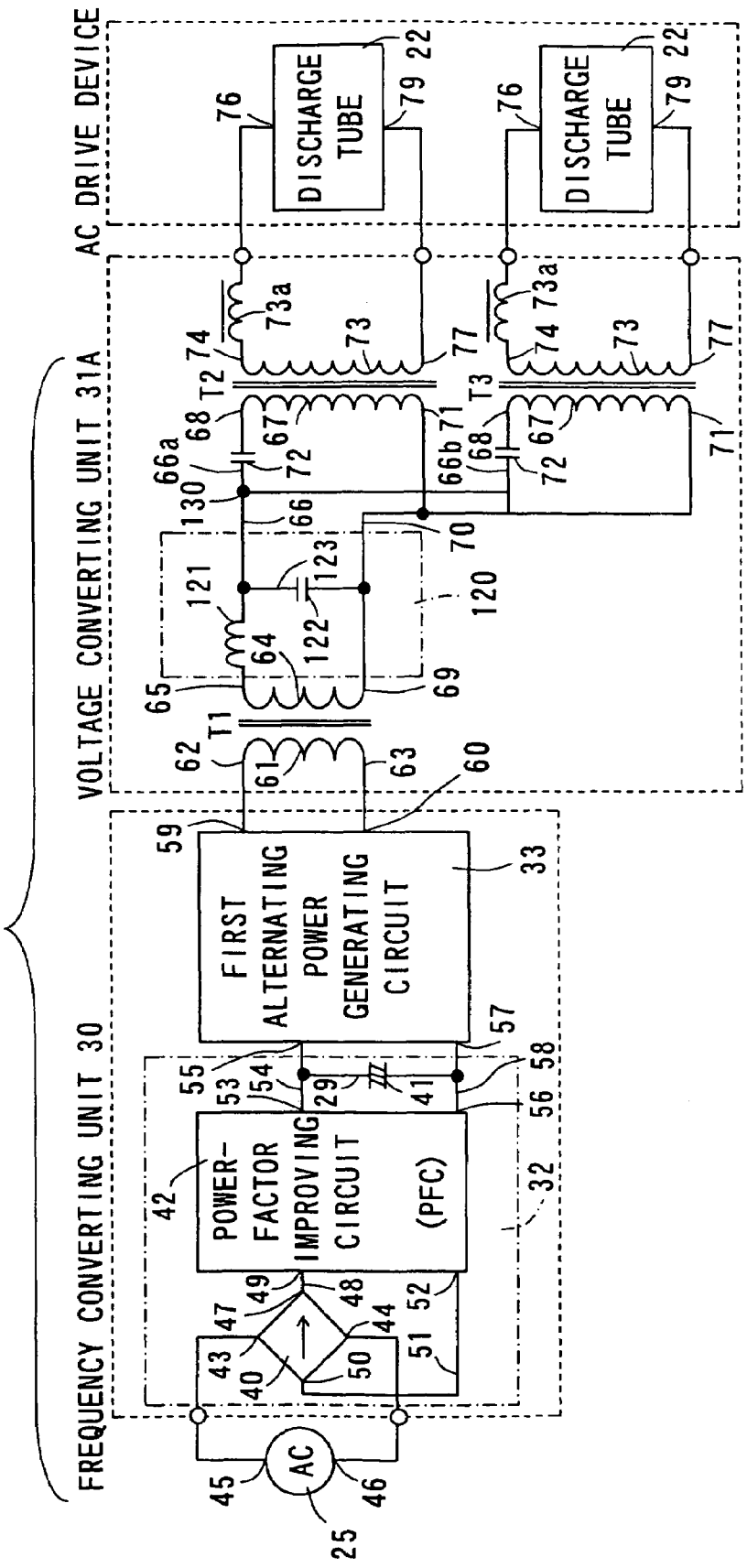
FIG. 11 is a block diagram showing a main structure of an AC conversion device according to another embodiment of the invention.

FIG. 11 is a block diagram showing a main structure of an AC conversion device 21A according to another embodiment of the invention. The AC conversion apparatus 21A is similar to the AC conversion device 21 shown in FIG. 4 but a part of a voltage converting unit 31A is different. Therefore, parts indicating the same components as those in the AC conversion device 21 shown in FIG. 4 will be denoted by the same reference numerals, and an explanation thereof will be omitted.

Compared with the voltage converting unit 31 shown in FIG. 4, the voltage converting unit 31A further includes a filter circuit part 120 for attenuating a harmonic component of frequency components included in AC power outputted from the frequency converting unit 30. In addition, the voltage converting unit 31A may eliminate the capacitors for waveform rectification 80 and the second connection line 28 shown in FIG. 4.

The filter circuit part 120 has an inductor 121, a capacitor 122, and a fifth connection line 123. The inductor 121 is interposed in the fifth line 66 before branching and connected to the fifth line 66 in series. The fifth line 123 connects the fifth line 66 before branching and the sixth line 70 before branching. The capacitor 122 is interposed in the fifth connection line 123 and connected to the fifth connection line 123 in series. In other words, the filter circuit part 120 realizes a low-pass filter circuit. Consequently, it is possible to remove a harmonic component of power generated by the secondary winding 64 of the first transformer. It is possible to reduce occurrence of unnecessary radiation noise by attenuating a harmonic of AC power with the filter circuit part 120 in this way. Moreover, it is possible to reduce noise that the liquid crystal display apparatus 20 gives to other electronic apparatuses.

In addition, it is possible to bring a waveform of an AC voltage given to the discharge tubes 22 close to a sine waveform by appropriately setting an electrostatic capacity of the capacitor 122 and an inductance of the inductor 121 even if the first alternating power generating circuit 33 outputs power of a rectangular waveform, whereby it is possible to drive the discharge tubes 22 stably.

Figure 12:
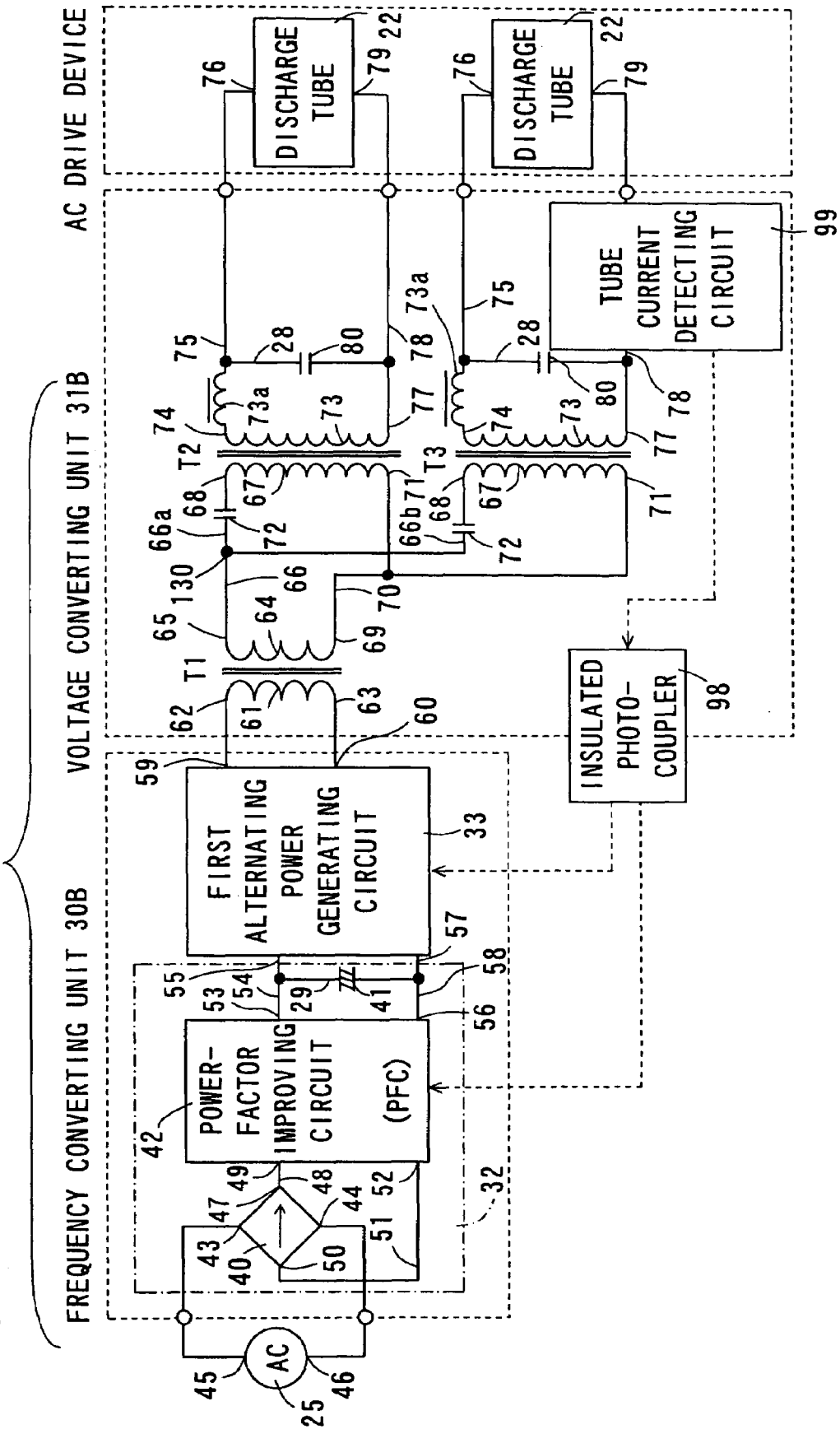
FIG. 12 is a block diagram showing a main structure of an AC conversion device according to still another embodiment of the invention.

FIG. 12 is a block diagram showing a main structure of an AC conversion device 21B according to still another embodiment of the invention. The AC conversion device 21B is similar to the AC conversion device 21 shown in FIG. 4 but parts of a frequency converting unit 30B and a voltage converting unit 31B are different. Therefore, parts indicating the same components as those in the AC conversion device 21 shown in FIG. 4 will be denoted by the same reference numerals, and an explanation thereof will be omitted.

Like the AC conversion device 21 shown in FIG. 4, the AC conversion device 21B directly drives the primary windings 67 of the second transformers T2 and T3 with a positive and negative symmetrical alternating voltage, which occurs in the secondary winding 64 of the first transformer T1 to thereby generate high-voltage power from the second transformers T2 and T3 and cause the discharge tubes 22 to emit light.

Compared with the voltage converting unit 31 shown in FIG. 4, the voltage converting unit 31B further includes a tube current detecting circuit 99 and an insulated photo-coupler 98. The tube current detecting circuit 99 detects a tube current flowing to the discharge tubes 22 and generates a tube current signal representing the detected current. The tube current detecting circuit 99 generates a tube current signal on the basis of a tube current flowing through a part or all of discharge tubes 22. The insulated photo-coupler 98 is an element transmitting an electric signal via an optical signal, in which an input signal and an output signal are electrically insulated from each other.

The tube current detecting circuit 99 is interposed in, for example, the eighth line 78. The tube current detecting circuit 99 gives a detected tube current signal to the first alternating power generating circuit 33. The first alternating power generating circuit 33 amplifies an error and subjects an ON/OFF ratio of a switching element to negative feedback control on the basis of the tube current signal given from the tube current detecting circuit 99.

More specifically, the first alternating power generating circuit 33 determines an error amount between the tube current signal and a predetermined target value. Then, the first alternating power generating circuit 33 multiplies the error amount by a predetermined control gain and subjects the switching element to PMW (Pulse Width Modulation) control or PMF (Pulse Frequency Modulation) control on the basis of a value obtained by the multiplication to adjust an ON/OFF ratio of the switching element or change a frequency. Consequently, it is possible to adjust a voltage time ratio (Duty) or a frequency that occurs in the secondary winding 64 of the first transformer T1 and to stabilize a tube current flowing through the discharge tubes 22.

Moreover, in this embodiment, a tube current signal is given to the first alternating power generating circuit 33 from the tube current detecting circuit 99 via an insulated photo-coupler 98. By giving the tube current signal via the insulated photo-coupler 98, it is possible to maintain insulating properties between the primary side and the secondary side.

In this way, in this embodiment, the negative feedback loop is constituted by the first alternating power generating circuit 33, the first transformer T1, the second transformers T2 and T3, the discharge tubes 22, the tube current detecting circuit 99, and the insulated photo-coupler 98. Note that the first alternating power generating circuit 33 may have any circuit structure no matter whether the first alternating power generating circuit 33 is the half-bridge type, the full-bridge type, and the push-pull type as long as the first alternating power generating circuit 33 is capable of generating a desired alternating voltage.

In addition, in the embodiment described above, the first alternating power generating circuit 33 is subjected to the negative feedback control using a tube current signal. However, the power-factor improving circuit 42 may be subjected to the negative feedback control instead of controlling the first alternating power generating circuit 33. In this case, the tube current detecting circuit 99 gives a tube current signal representing a detected tube current to the power-factor improving circuit 42. The power-factor improving circuit 42 subjects an ON/OFF ratio of the switching element to the negative feedback control on the basis of the tube current signal given from the tube current detecting circuit 99.

More specifically, the power-factor improving circuit 42 determines an error amount of the tube current signal and a predetermined target amount. Then, the power-factor improving circuit 42 multiplies the error amount by a predetermined control gain and subjects the switching element to PWM control or PFM control to set an ON/OFF ratio on the basis of a value obtained by the multiplication. Consequently, it is possible to adjust a voltage amplitude that occurs in the secondary winding 64 of the first transformer T1 and to stabilize a tube current flowing through the discharge tubes 22. Such a structure for detecting a tube current and controlling the first alternating power generating circuit 33 or the power-factor improving circuit 42 is applicable to the embodiment shown in FIG. 11 and other embodiments. Note that, concerning the case in which a tube current signal is given to the power-factor improving circuit 42 from the tube current detecting circuit 99; the first DC power generating circuit 32 and the second DC power generating circuit 35 cannot be commonly used and are provided independently from each other.

Figure 13:
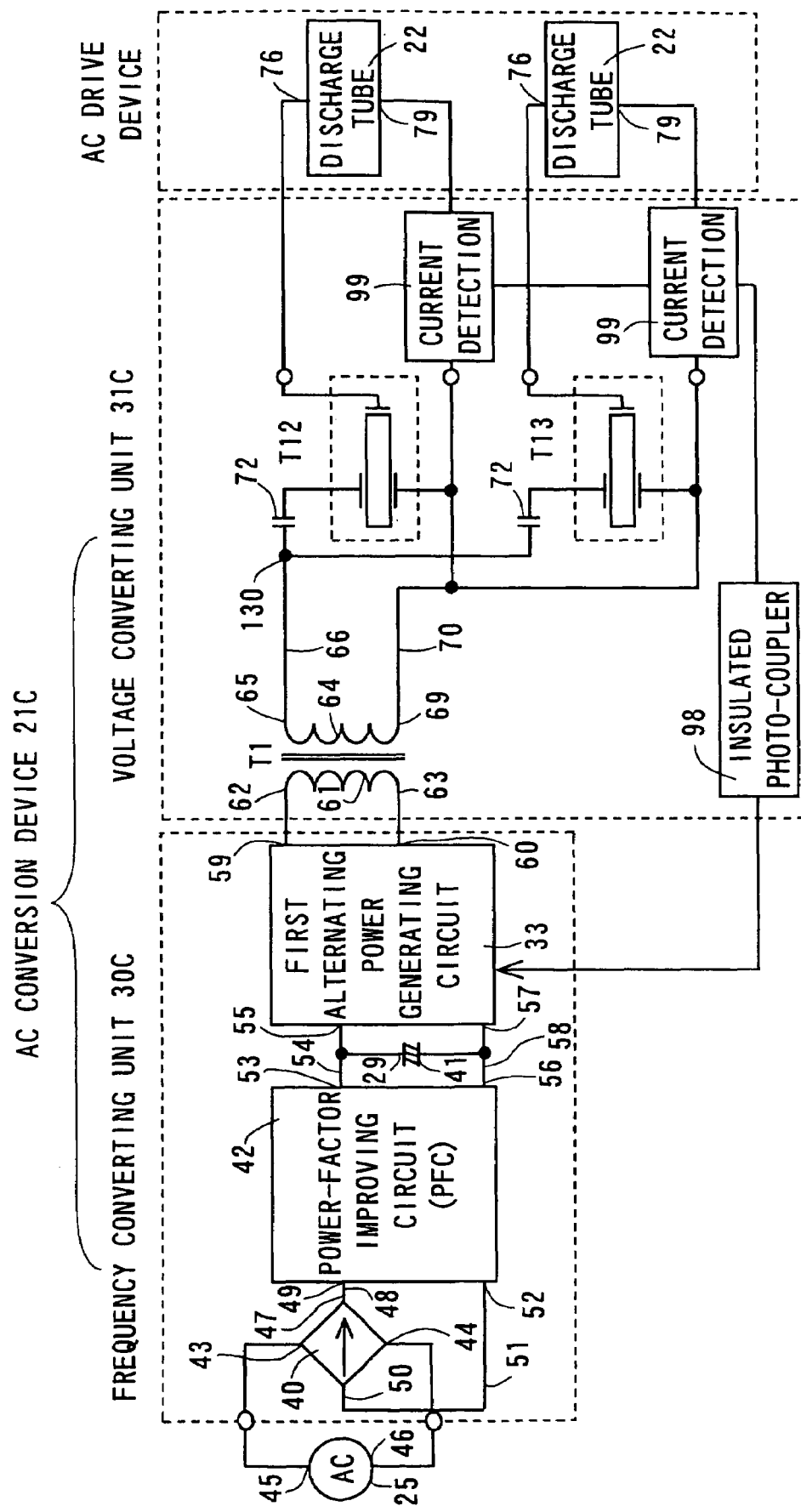
FIG. 13 is a block diagram showing a main structure of an AC conversion device according to still another embodiment of the invention.

FIG. 13 is a block diagram showing a main structure of an AC conversion device 21C according to still another embodiment of the invention. The AC conversion device 21C is similar to the AC conversion device 21B shown in FIG. 12 but a structure of the second transformers T2 and T3 is different. Therefore, parts indicting the same components as those in the AC converting device 21B shown in FIG. 12 will be denoted by the same reference numerals, and a detailed explanation thereof will be omitted.

Piezoelectric transformers may be used as the second transformers T2 and T3 of the AC conversion device 21C instead of electromagnetic transformers. Piezoelectric transformers T12 and T13 are transformers that use energy propagation at the time of expansion and contraction due to a piezoelectric element to convert electric energy into mechanical vibration energy and convert the mechanical vibration energy into the electric energy again and obtain a booting ratio to be a ratio of input and output voltages. A resonance frequency is used for the energy propagation of the piezoelectric transformer described above. Note that, concerning the components of the circuit structure other than the AC conversion device shown in FIG. 12, for example, the AC conversion devices 21 and 21A shown in FIGS. 4 and 11, a case in which the piezoelectric transformers T12 and T13 are used in the voltage conversion unit 31 is also included in the invention. Since the second transformer is realized by the piezoelectric transformer, it is possible to realize reduction in thickness and size, inflammability, simplification of a structure, and improvement of efficiency.

Figure 15:
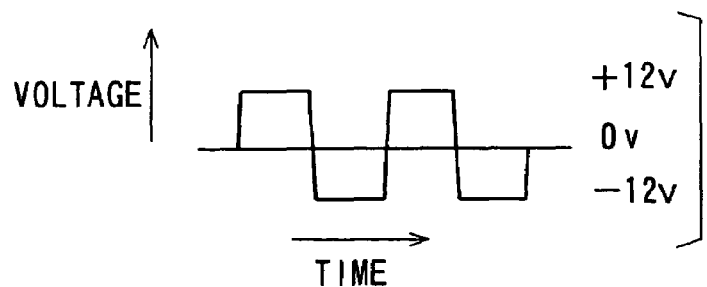
FIG. 15 is a graph showing an output voltage waveform of a first transformer.

FIG. 14 is a circuit diagram showing a first alternating power generating circuit 33A according to still another embodiment of the invention. In addition, FIG. 15 is a graph showing an output voltage waveform of the first transformer T1. The first alternating power generating circuit 33A according to the embodiment of the invention includes two switching elements Tr4 and Tr5 and a control IC IC3 to realize a half-bridge type AC converting circuit.

As in the first alternating power generating circuit 33 shown in FIG. 9, a control IC IC3 alternately switches ON/OFF states of the two switching elements Tr4 and Tr5, whereby the first alternating power generating circuit 33A changes a current flowing in the primary winding 61 of the first transformer T1. The control IC IC3 switching the ON/OFF states of the respective switching elements Tr4 and Tr5 at a predetermined period, whereby the first alternating power generating circuit 33A can give an alternating current to the winding 61 of the first transformer T1. A voltage waveform of AC power outputted from the first alternating power generating circuit 33A is a rectangular waveform.

Consequently, as shown in FIG. 15, a voltage waveform of power outputted from the first transformer T1 is a rectangular waveform alternating at a predetermined voltage. Note that, as shown in FIGS. 12 and 13, a tube current signal may be given to the control IC IC3 from the tube current detecting circuit 99. In this case, the control IC IC3 may subject ON/OFF ratios of the switching elements Tr4 and Tr5 to the negative feedback control on the basis of a tube current signal.

Figure 17:
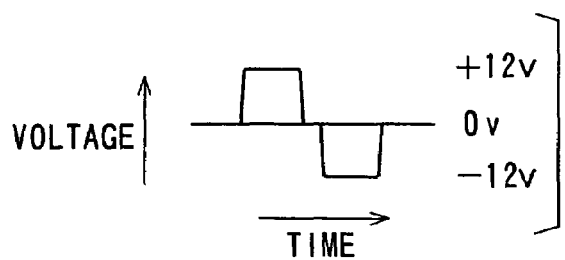
FIG. 17 is a graph showing an output voltage waveform of a first transformer.

FIG. 16 is a circuit diagram showing a first alternating power generating circuit 33B according to still another embodiment of the invention. In addition, FIG. 17 is a graph showing an output voltage waveform of the first transformer T1. The first alternating power generating circuit 33B includes four switching elements Tr6 to Tr9 and a control IC IC4 to realize a full-bridge type AC converting circuit.

Like the first alternating power generating circuit 33 shown in FIG. 9, the first alternating power generating circuit 33B alternately switches ON/OFF states of corresponding two switching elements Tr6 and Tr9 of the four switching elements and remaining two switching elements Tr7 and Tr8 at a predetermined period to thereby switch a direction of a current flowing in the primary winding 61 of the first transformer T1. Consequently, it is possible to give an alternating current to the primary winding 61 of the first transformer T1.

A voltage waveform of AC power outputted from the first alternating power generating circuit 33B is a rectangular waveform. Therefore, a voltage waveform of power outputted from the first transformer T1 is also a rectangular wave that alternates at a predetermined voltage as shown in FIG. 17. Note that, as shown in FIGS. 12 and 13, the control IC IC4 may subject the ON/OFF ratio of the switching elements Tr4 and Trr5 to the negative feedback control on the basis of a tube current signal.

More specifically, the first alternating power generating circuit 33B includes two transformer circuits for drive Dr1 and Dr2 that are driven by the control IC IC4. The transformer circuits for drive Dr1 and Dr2 have primary windings and secondary windings as in the above-mentioned transformer and generate power in the secondary windings as power is given to the primary windings. The primary windings of the transformer circuits for drive Dr1 and Dr2 are connected to the control IC IC4 and the secondary windings are connected to the respective switching elements Tr6 to Tr9.

The control IC IC4 alternately switches power given to the primary windings of the two transformer circuits for drive Dr1 and Dr2. When power is given from the primary windings of the control IC IC4, the respective transformer circuits for drive Dr1 and Dr2 generate power in the secondary windings and supply the power to the corresponding switching elements.

In the respective transformer circuits for drive Dr1 and Dr2, the primary winding and secondary winding thereof are insulated from each other. Therefore, even in the case in which the ON/OFF ratio of the switching elements are subjected to the negative feedback control on the basis of a tube current signal, the intervention of the insulated photo-coupler 98 is unnecessary. Therefore, a tube current signal may be directly given to the control IC IC4 from the tube current detecting circuit 99.

Although the two transformer circuits for drive Dr1 and Dr2 are used in this embodiment, four transformer circuits for drive Dr1 and Dr2 may be used. In addition, the transformer circuits for drive Dr1 and Dr2 may be eliminated by using the insulated photo-coupler 98.

A tap may be provided in the middle of the coil-like portion of the primary winding 61 of the first transformer T1. In this case, a bypass line 95 connecting the tap and a line 96 which is connected to one output terminal 60 in the first alternating power generating circuit 33B, is formed. An inductor for current superimposition 97 is connected to the bypass line 95 in series.

In this state, leakage inductance is given to the primary winding 61 of the first transformer T1 with high coupling characteristics to superimpose a circulating current caused by the inductor 97 over a primary winding current flowing in the primary winding 61 of the first transformer T1. Consequently, it is possible to cause current resonance at the ON/OFF time of the switching elements Tr6 to Tr9 and to reduce switching loss.

the bypass line 95, in which such an inductor 97 for current superimposition is interposed, can be connected to a tap that is provided one of both end portions, a central part, or an arbitrary middle part of the coil-like portion of the primary winding 61 of the first transformer T1. In addition, the bypass line 95 may be provided to connect a tap, which is provided in one of the both end portions of the coil-like portion of the secondary winding 64 of the first transformer T1, and the fifth line 66 and the sixth line 70.

In this embodiment, the bypass line 95 is connected to a position that is apart from one end portion by a distance obtained by dividing the coil-like portion of the primary winding 61 of the first transformer T1 into four. In other words, the tap for connecting the bypass line is provided in a position apart from one end portion of the primary winding 61 by ¼ of a dimension in a winding stacking direction of the primary winding 61. Consequently, it is possible to lower a potential difference at both ends of the inductor for current superimposition 97 and to reduce a size of the inductor for current superimposition 97 as much as possible.

Figure 18:
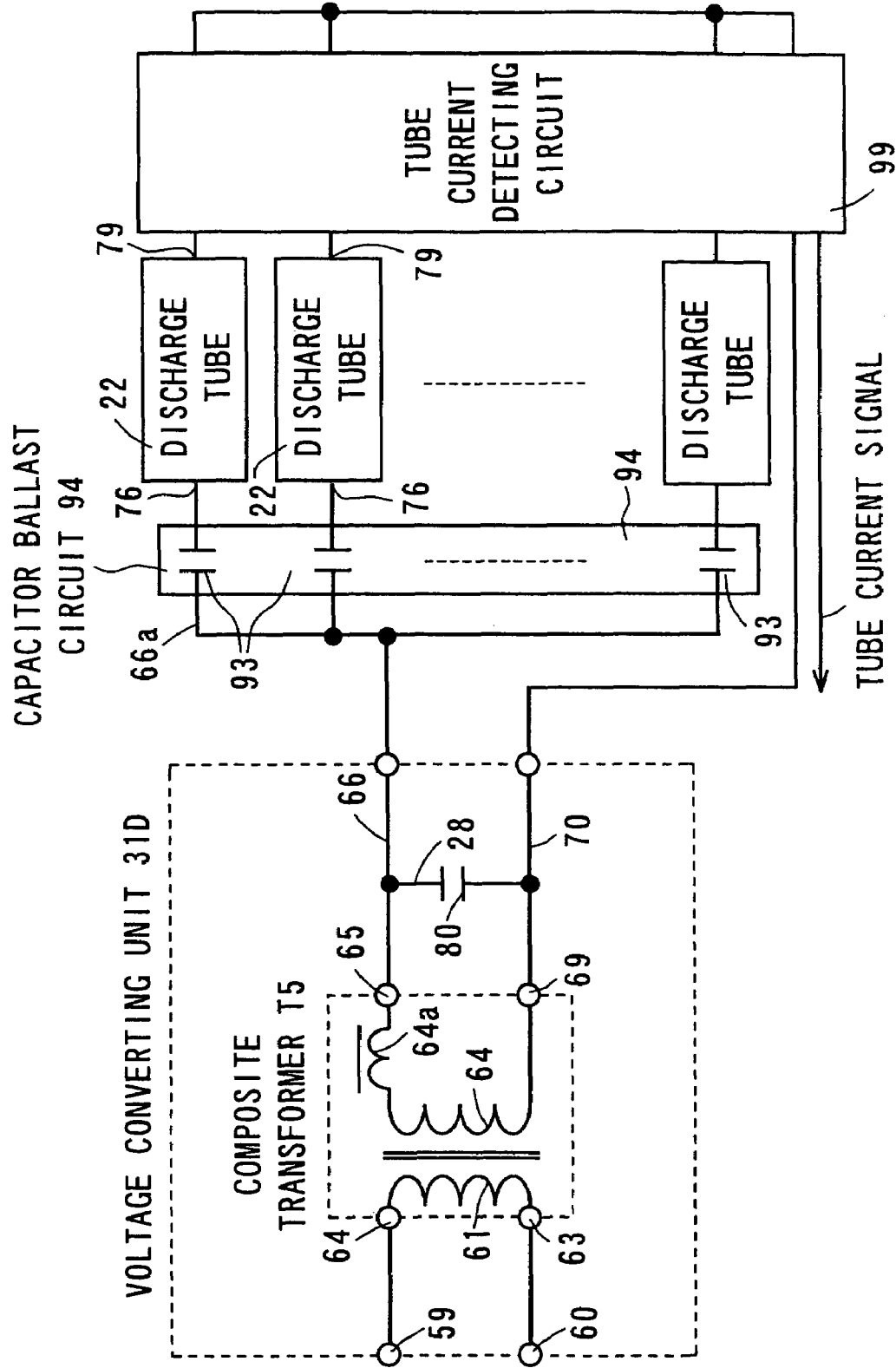
FIG. 18 is a circuit diagram showing a voltage converting unit according to still another embodiment of the invention.

FIG. 18 is a circuit diagram showing a voltage converting unit 31D according to still another embodiment of the invention. In the voltage converting unit 31D, a composite transformer T5, in which the first transformer T1 and the second transformer T2 are combined, is provided instead of the first transformer T1 and the second transformer T2. In the voltage converting unit 31D shown in FIG. 18, components corresponding to those in the voltage converting unit 31B shown in FIG. 12 will be denoted by the same reference numerals, and an explanation thereof will be omitted.

One output terminal 59 of the first alternating power generating circuit 59 is connected to one input terminal 64 of the primary winding 61 of the composite transformer T5. In addition, the other output terminal 60 of the first alternating power generating circuit 59 is connected to the other input terminal 63 of the primary winding 61 of the composite transformer T5. One output terminal 65 of the secondary winding 64 of the composite transformer T5 is connected to one input terminals 76 of the respective discharge tubes 22 via the fifth line 66. In addition, one output terminal 69 of the secondary winding 64 of the composite transformer T5 is connected to the other input terminals 79 of the respective discharge tubes 22 via the sixth line 70.

The composite transformer T5 satisfies the safety standard required for the first transformer T1, has the withstand voltage structure required for the second transformer T2, and boosts power to be given. In other words, the voltage converting unit 31D has a circuit structure in which a boosting capability is given to the first transformer T1 shown in FIG. 12 and the second transformers T2 and T3 are eliminated.

In this way, the voltage converting unit 31D is capable of driving the plural discharge tubes 22 only with one composite transformer T5. Therefore, compared with the voltage converting unit 31B shown in FIG. 12, it is possible to reduce copper loss, which occurs in the secondary winding of the first transformer T1, and copper loss and iron loss, which occur in the second transformers T2 and T3. Consequently, it is possible to further reduce power loss of the liquid crystal display apparatus. Therefore, it becomes possible to improve reliability and effectively use energy through the reduction of internal loss of the apparatus and to effectively use resources through the removal of the second transformers T2 and T3. Note that, since the composite transformer T5 transforms a voltage to a high voltage capable of driving discharge tubes, it is possible to drive the plural discharge tubes 22 with one composite transformer T5.

A leakage inductance 64a is formed in the secondary winding 64 of the composite transformer T5 of this embodiment. Further, the second connection line 28 connecting the fifth line 66 and the sixth line 70 is provided. The capacitor for waveform rectification 80 is connected to the second connection line 28 in series. The leakage inductance 64a and the capacitor for waveform rectification 80 are provided in this way, whereby it is possible to constitute a low-pass filter, remove a harmonic component, and brings an output power waveform close to a sine waveform. In addition, in the case in which the first alternating power generating circuit 33B is a full-bridge circuit or the like, as in the first transformer T1 shown in FIG. 16, a tap may be formed in the composite transformer T5.

In this embodiment, a capacitor ballast circuit 94 is interposed in the voltage converting unit 31D. The capacitor ballast circuit 94 is an example of a tube current balancing circuit that balances a tube current in order to prevent deficiency of the discharge tubes 22 due to negative resistance when the composite transformer T5 is connected to the plural discharge tubes 22 in parallel. The capacitor ballast circuit 94 reduces a tube current in the case in which a resistance of a discharge tube falls. In this embodiment, capacitors for ballast 93 are interposed in series in a plurality of branched lines 66a which are branched for each of the discharge tubes 22 from the fifth line 66, respectively. In addition, as in the voltage converting unit 31B shown in FIG. 12, a tube current signal representing a tube current may be given to a first alternating power generating circuit or a power-factor improving circuit.

Figure 19:
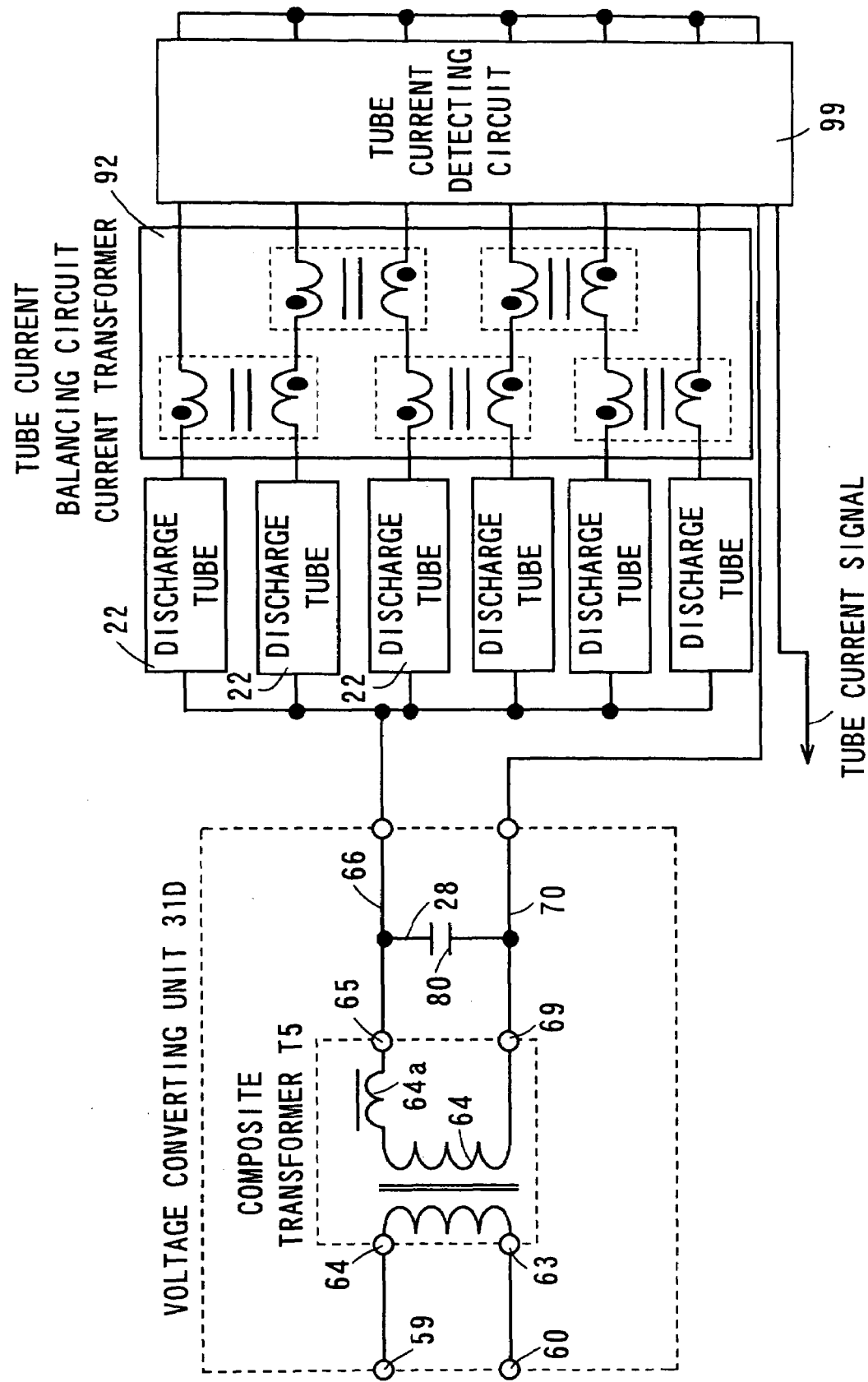
FIG. 19 is a block diagram showing a form of the voltage converting unit and another tube current balancing circuit.

FIG. 19 is a block diagram showing a form of the voltage converting unit 31D and another tube current balancing circuit. As an example of the invention, a tube current balancing circuit realized by a current transformer circuit 92 may be provided instead of the capacitor ballast circuit 94 shown in FIG. 18. In this case, the current transformer circuit 92 combines tube currents from the respective discharge tubes 22 using a current transformer to balance the tube currents. The combination of the frequency converting unit and the voltage converting unit explained as above is only an example, and other combinations also constitute the AC conversion device of the invention.

Figure 20:
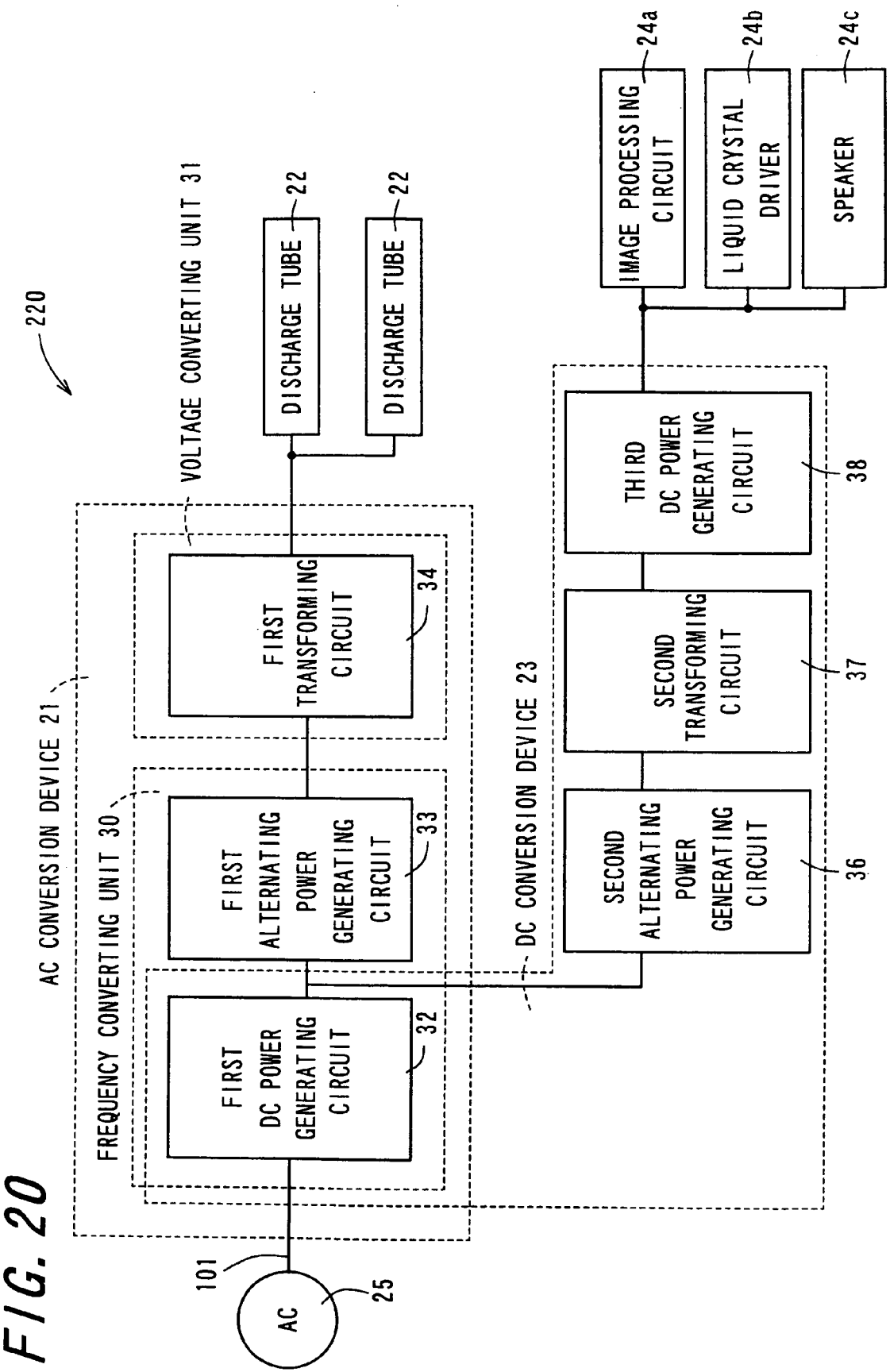
FIG. 20 is a block diagram showing a liquid crystal display apparatus according to still another embodiment of the invention.

FIG. 20 is a block diagram showing a liquid crystal display apparatus 220 according to still another embodiment of the invention. The liquid crystal display apparatus 220 has a structure similar to the liquid crystal display apparatus 20 shown in FIGS. 2 and 3. Components identical with those in the liquid crystal display apparatus 20 will be denoted by the same reference numerals, and an explanation thereof will be omitted.

The liquid crystal display apparatus 220 has the AC conversion device 21 and the DC conversion device 23. The AC conversion device 21 has the frequency converting unit 30 and the voltage converting unit 31. The frequency converting unit 30 has the first DC power generating circuit 32 and the first alternating power generating circuit 33. Such an AC converting device 21 has the same structure as the AC conversion device 21 shown in FIG. 2.

The DC conversion device 23 is given DC power from the first DC power generating circuit 32 and converts the DC power into DC power of a predetermined voltage. More specifically, the DC conversion device 23 has the first DC power generating circuit 32, the second alternating power generating circuit 36, the second transforming circuit 37, and the third DC power generating circuit 38. The second alternating power generating circuit 36 converts DC power given from the first DC power generating circuit 32 into alternating power and gives the converted alternating power to the second transforming circuit 37. The second transforming circuit 37 generates power obtained by transforming the alternating power given from the second alternating power generating circuit 36 using the transformer and gives the generated power to the third DC power generating circuit 38. The third DC power generating circuit 38 converts the alternating power given from the second transforming circuit 37 into DC power and gives the converted DC power to the image processing circuit 24a, the liquid crystal driver 24b, and the speaker 24c that are DC drive devices.

In other words, compared with the liquid crystal display apparatus 20 shown in FIG. 1, in the liquid crystal display apparatus 220, the first CD power generating circuit 32 of the AC conversion device 21 and the second DC power generating circuit 35 in the DC conversion device 23 are realized by using one circuit as both the power generating circuits. With such a structure, it is possible to reduce the number of circuits that converts AD power given from a shared power supply into a direct current and to further simplify the structure. Consequently, it is possible to realize a liquid crystal display apparatus in small and inexpensively. Note that the first alternating power generating circuit 33 and the second alternating power generating circuit 36 may be realized by different circuit structures.

In this embodiment, the case in which the power-factor improving circuit (PFC) is provided in the drive system is explained. However, the power-factor improving circuit is not an essential structure for the drive system of the invention. For example, even a case in which there is no power-factor improving circuit in the circuit structure shown in FIGS. 4, 5, and 11, such a structure is included in the invention. Note that it is possible to comply with a harmonic regulation and to stabilize a wide range of voltage fluctuation of a supplied AC voltage at a constant voltage by providing the power-factor improving circuit. In addition, in FIGS. 12 and 13, since the feedback circuit is connected to the power-factor improving circuit, the power-factor improving circuit is necessary.

The liquid crystal display apparatus 20 is one embodiment of the invention. Therefore, it is possible to change the structure within the scope of the invention. For example, the liquid crystal display apparatus 20 is explained as an example of the drive system of the invention. However, other drive systems may be adopted. In other words, the drive system of the invention may be any apparatus as long as the apparatus incorporates a DC drive device and an AC drive device and is driven by power from an AC power supply. For example, the AC drive device of the drive system of the invention may be a device other than a discharge tube. In addition, the power supply giving power to the drive system may be a power supply other than a commercial power supply. The word "drive" referred to in the invention indicates operations in general caused by supply of power. For example, as described above, the backlight emitting operation by the discharge tubes 22 is also included in "drive". Further, the above-mentioned circuit structure is an embodiment of the invention. Therefore, drive systems realized by circuit structures other than the circuit structure are also included in the invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A drive system that is given AC power from an AC power supply to drive targets to be activated, comprising:
    an AC conversion device for acquiring AC power from an AC power supply and converting the supplied AC power into converted AC power having a predetermined frequency and a predetermined voltage;
    an AC drive device that is given the converted AC power to be activated;
    a DC conversion device for acquiring AC power from an AC power supply and converting the supplied AC power into converted DC power having a predetermined voltage; and
    a DC drive device that is given the converted DC power to be activated,
    wherein the AC conversion device has a frequency converting unit for converting a frequency of AC power into a predetermined frequency and a voltage converting unit for converting a voltage of AC power into a predetermined voltage,
    the frequency converting unit includes only one pair of a DC power generating circuit for AC conversion and an alternating power generating circuit for AC conversion, in which the DC power generating circuit for AC conversion converts the supplied AC power into DC power, and the alternating power generating circuit for AC conversion converts DC power which is generated by the DC power generating circuit for AC conversion, into AC power of a predetermined frequency, and
    wherein the voltage converting unit includes:
        a first transformer for dropping a voltage of AC power generated by the alternating power generating circuit for AC conversion, and generating power electrically insulated against the AC power supply; and
        a second transformer for boosting the voltage of AC power dropped by the first transformer and generating converted AC power, and
        wherein the second transformer is directly driven by an alternating voltage outputted from the first transformer.

2. A drive system that is given AC power from an AC power supply to drive targets to be activated, comprising:
    an AC conversion device for acquiring AC power from an AC power supply and converting the supplied AC power into converted AC power having a predetermined frequency and a predetermined voltage;
    an AC drive device that is given the converted AC power to be activated;
    a DC conversion device for acquiring AC power from an AC power supply and converting the supplied AC power into converted DC power having a predetermined voltage; and a DC drive device that is given the converted DC power to be activated, wherein the AC conversion device has a frequency converting unit for converting a frequency of AC power into a predetermined frequency and a voltage converting unit for converting a voltage of AC power into a predetermined voltage, the frequency converting unit includes only one pair of a DC power generating circuit for AC conversion and an alternating power generating circuit for AC conversion, in which the DC power generating circuit for AC conversion converts the supplied AC power into DC power, and the alternating power generating circuit for AC conversion converts DC power which is generated by the DC power generating circuit for AC conversion, into AC power of a predetermined frequency, and wherein the voltage converting unit is realized by a single transformer for transforming a voltage of alternating power generated by the alternating power generating circuit for AC conversion and generating converted AC power electrically insulated against an AC power supply.

3. A drive system that is given AC power from an AC power supply to drive targets to be activated, comprising:

an AC conversion device for acquiring AC power from an AC power supply and converting the supplied AC power into converted AC power having a predetermined frequency and a predetermined voltage;

an AC drive device that is given the converted AC power to be activated;

a DC conversion device for acquiring AC power from an AC power supply and converting the supplied AC power into converted DC power having a predetermined voltage; and a DC drive device that is given the converted DC power to be activated, wherein the AC conversion device has a frequency converting unit for converting a frequency of AC power into a predetermined frequency and a voltage converting unit for converting a voltage of AC power into a predetermined voltage, the frequency converting unit includes only one pair of a DC power generating circuit for AC conversion and an alternating power generating circuit for AC conversion, in which the DC power generating circuit for AC conversion converts the supplied AC power into DC power, and the alternating power generating circuit for AC conversion converts DC power which is generated by the DC power generating circuit for AC conversion, into AC power of a predetermined frequency, and wherein the DC conversion device includes:

a first DC power generating circuit for DC conversion, for converting the supplied AC power to be given into DC power;

an alternating power generating circuit for DC conversion, for converting the DC power generated by the first DC power generating circuit for DC conversion into AC power of a predetermined frequency;

a transforming circuit for DC conversion, for converting a voltage of the AC power converted by the alternating power generating circuit for DC conversion into a predetermined voltage; and a second DC power generating circuit for DC conversion, for converting the AC power converted by the transforming circuit for DC conversion into DC power, and wherein the DC power generating circuit for AC conversion is realized by the same circuit structure as the first DC power generating circuit for DC conversion, and the alternating power generating circuit for AC conversion is realized by the same circuit structure as the alternating power generating circuit for DC conversion.

4. A drive system that is given AC power from an AC power supply to drive targets to be activated, comprising:

an AC conversion device for acquiring AC power from an AC power supply and converting the supplied AC power into converted AC power having a predetermined frequency and a predetermined voltage;

an AC drive device that is given the converted AC power to be activated;

a DC conversion device for acquiring AC power from an AC power supply and converting the supplied AC power into converted DC power having a predetermined voltage; and a DC drive device that is given the converted DC power to be activated, wherein the AC conversion device has a frequency converting unit for converting a frequency of AC power into a predetermined frequency and a voltage converting unit for converting a voltage of AC power into a predetermined voltage, the frequency converting unit includes only one pair of a DC power generating circuit for AC conversion and an alternating power generating circuit for AC conversion, in which the DC power generating circuit for AC conversion converts the supplied AC power into DC power, and the alternating power generating circuit for AC conversion converts DC power which is generated by the DC power generating circuit for AC conversion, into AC power of a predetermined frequency, and wherein the DC conversion device includes:

a first DC power generating circuit for DC conversion, for converting the supplied AC power to be given into DC power;

an alternating power generating circuit for DC conversion, for converting the DC power generated by the first DC power generating circuit for DC conversion into AC power of a predetermined frequency;

a transforming circuit for DC conversion, for converting a voltage of the AC power converted by the alternating power generating circuit for DC conversion into a predetermined voltage; and a second DC power generating circuit for DC conversion, for converting the AC power converted by the transforming circuit for DC conversion into DC power, and wherein the DC power generating circuit for AC conversion and the first DC power generating circuit for DC conversion are realized by one circuit used as both the circuits.

5. A drive system that is given AC power from an AC power supply to drive targets to be activated, comprising:

an AC conversion device for acquiring AC power from an AC power supply and converting the supplied AC power into converted AC power having a predetermined frequency and a predetermined voltage;

an AC drive device that is given the converted AC power to be activated;

a DC conversion device for acquiring AC power from an AC power supply and converting the supplied AC power into converted DC power having a predetermined voltage; and a DC drive device that is given the converted DC power to be activated, wherein the AC conversion device has a frequency converting unit for converting a frequency of AC power into a predetermined frequency and a voltage converting unit for converting a voltage of AC power into a predetermined voltage, the frequency converting unit includes only one pair of a DC power generating circuit for AC conversion and an alternating power generating circuit for AC conversion, in which the DC power generating circuit for AC conversion converts the supplied AC power into DC power, and the alternating power generating circuit for AC conversion converts DC power which is generated by the DC power generating circuit for AC conversion, into AC power of a predetermined frequency, and wherein the voltage converting unit includes:

a transformer for converting a voltage of AC power to be given; and a capacitor that is connected to a primary winding of the transformer in series.

6. A drive system that is given AC power from an AC power supply to drive targets to be activated, comprising:

an AC conversion device for acquiring AC power from an AC power supply and converting the supplied AC power into converted AC power having a predetermined frequency and a predetermined voltage;

an AC drive device that is given the converted AC power to be activated;

a DC conversion device for acquiring AC power from an AC power supply and converting the supplied AC power into converted DC power having a predetermined voltage; and a DC drive device that is given the converted DC power to be activated, wherein the AC conversion device has a frequency converting unit for converting a frequency of AC power into a predetermined frequency and a voltage converting unit for converting a voltage of AC power into a predetermined voltage, the frequency converting unit includes only one pair of a DC power generating circuit for AC conversion and an alternating power generating circuit for AC conversion, in which the DC power generating circuit for AC conversion converts the supplied AC power into DC power, and the alternating power generating circuit for AC conversion converts DC power which is generated by the DC power generating circuit for AC conversion, into AC power of a predetermined frequency, and wherein the voltage converting unit further has a filter circuit part for attenuating a harmonic component of frequency components included in the AC power outputted from the frequency converting unit.

7. A drive system that is given AC power from an AC power supply to drive targets to be activated, comprising:

an AC conversion device for acquiring AC power from an AC power supply and converting the supplied AC power into converted AC power having a predetermined frequency and a predetermined voltage;

an AC drive device that is given the converted AC power to be activated;

a DC conversion device for acquiring AC power from an AC power supply and converting the supplied AC power into converted DC power having a predetermined voltage; and a DC drive device that is given the converted DC power to be activated, wherein the AC conversion device has a frequency converting unit for converting a frequency of AC power into a predetermined frequency and a voltage converting unit for converting a voltage of AC power into a predetermined voltage, the frequency converting unit includes only one pair of a DC power generating circuit for AC conversion and an alternating power generating circuit for AC conversion, in which the DC power generating circuit for AC conversion converts the supplied AC power into DC power, and the alternating power generating circuit for AC conversion converts DC power which is generated by the DC power generating circuit for AC conversion, into AC power of a predetermined frequency, and wherein the voltage converting unit includes:

a transformer for converting a voltage of AC power to be given; and a bypass line for connecting an intermediate part of a coil-like portion of a primary winding of the transformer and one end part of the primary winding, and wherein an inductor for current superimposition is connected to the bypass line in series.

8. A drive system that is given AC power from an AC power supply to drive targets to be activated, comprising:

an AC conversion device for acquiring AC power from an AC power supply and converting the supplied AC power into converted AC power having a predetermined frequency and a predetermined voltage;

an AC drive device that is given the converted AC power to be activated;

a DC conversion device for acquiring AC power from an AC power supply and converting the supplied AC power into converted DC power having a predetermined voltage; and a DC drive device that is given the converted DC power to be activated, wherein the AC conversion device has a frequency converting unit for converting a frequency of AC power into a predetermined frequency and a voltage converting unit for converting a voltage of AC power into a predetermined voltage, the frequency converting unit includes only one pair of a DC power generating circuit for AC conversion and an alternating power generating circuit for AC conversion, in which the DC power generating circuit for AC conversion converts the supplied AC power into DC power, and the alternating power generating circuit for AC conversion converts DC power which is generated by the DC power generating circuit for AC conversion, into AC power of a predetermined frequency, and wherein the frequency converting unit further has a power-factor improving circuit for improving a power factor at the time when the supplied AC power is converted into DC power by the DC power generating circuit for AC conversion.

9. A drive system that is given AC power from an AC power supply to drive targets to be activated, comprising:

an AC conversion device for acquiring AC power from an AC power supply and converting the supplied AC power into converted AC power having a predetermined frequency and a predetermined voltage;

an AC drive device that is given the converted AC power to be activated;

a DC conversion device for acquiring AC power from an AC power supply and converting the supplied AC power into converted DC power having a predetermined voltage; and a DC drive device that is given the converted DC power to be activated, wherein the AC conversion device has a frequency converting unit for converting a frequency of AC power into a predetermined frequency and a voltage converting unit for converting a voltage of AC power into a predetermined voltage, the frequency converting unit includes only one pair of a DC power generating circuit for AC conversion and an alternating power generating circuit for AC conversion, in which the DC power generating circuit for AC conversion converts the supplied AC power into DC power, and the alternating power generating circuit for AC conversion converts DC power which is generated by the DC power generating circuit for AC conversion, into AC power of a predetermined frequency, and wherein the drive system is a liquid crystal display apparatus that is given AC power and drives discharge tubes.

10. An AC conversion device provided in a drive system that is given AC power from an AC power supply to drive targets to be activated, comprising:

the AC conversion device for acquiring AC power from an AC power supply and converting the supplied AC power into converted AC power having a predetermined frequency and a predetermined voltage;

an AC drive device that is given the converted AC power to be activated;

a DC conversion device for acquiring AC power from an AC power supply and converting the supplied AC power into converted DC power having a predetermined voltage; and a DC drive device that is given the converted DC power to be activated, wherein the AC conversion device has a frequency converting unit for converting a frequency of AC power into a predetermined frequency and a voltage converting unit for converting a voltage of AC power into a predetermined voltage, the frequency converting unit includes only one pair of a DC power generating circuit for AC conversion and an alternating power generating circuit for AC conversion, in which the DC power generating circuit for AC conversion converts the supplied AC power into DC power, and the alternating power generating circuit for AC conversion converts DC power which is generated by the DC power generating circuit for AC conversion, into AC power of a predetermined frequency.

11. A drive system that is given AC power from an AC power supply to drive targets to be activated, comprising:

an AC conversion device for acquiring AC power from an AC power supply and converting the supplied AC power into converted AC power having a predetermined frequency and a predetermined voltage;

an AC drive device that is given the converted AC power to be activated;

a DC conversion device for acquiring AC power from an AC power supply and converting the supplied AC power into converted DC power having a predetermined voltage; and a DC drive device that is given the converted DC power to be activated, wherein the AC conversion device has a frequency converting unit for converting a frequency of AC power into a predetermined frequency and a voltage converting unit for converting a voltage of AC power into a predetermined voltage, the frequency converting unit includes only one pair of a DC power generating circuit for AC conversion and an alternating power generating circuit for AC conversion, in which the DC power generating circuit for AC conversion converts the supplied AC power into DC power, and the alternating power generating circuit for AC conversion converts DC power which is generated by the DC power generating circuit for AC conversion, into AC power of a predetermined frequency, and wherein the AC drive device is a discharge tube for emitting light.

12. A drive system that is given AC power from an AC power supply to drive targets to be activated, comprising:

an AC conversion device for acquiring AC power from an AC power supply and converting the supplied AC power into converted AC power having a predetermined frequency and a predetermined voltage;

an AC drive device that is given the converted AC power to be activated;

a DC conversion device for acquiring AC power from an AC power supply and converting the supplied AC power into converted DC power having a predetermined voltage; and a DC drive device that is given the converted DC power to be activated, wherein the AC conversion device has a frequency converting unit for converting a frequency of AC power into a predetermined frequency and a voltage converting unit for converting a voltage of AC power into a predetermined voltage, the frequency converting unit includes only one pair of a DC power generating circuit for AC conversion and an alternating power generating circuit for AC conversion, in which the DC power generating circuit for AC conversion converts the supplied AC power into DC power, and the alternating power generating circuit for AC conversion converts DC power which is generated by the DC power generating circuit for AC conversion, into AC power of a predetermined frequency, and wherein the AC drive device is at least part of a light emitting member in a backlight of a liquid crystal display.

13. A drive system that is given AC power from an AC power supply to drive targets to be activated, comprising:

an AC conversion device for acquiring AC power from an AC power supply and converting the supplied AC power into converted AC power having a predetermined frequency and a predetermined voltage;

an AC drive device that is given the converted AC power to be activated;

a DC conversion device for acquiring AC power from an AC power supply and converting the supplied AC power into converted DC power having a predetermined voltage; and a DC drive device that is given the converted DC power to be activated, wherein the AC conversion device has a frequency converting unit for converting a frequency of AC power into a predetermined frequency and a voltage converting unit for converting a voltage of AC power into a predetermined voltage, the frequency converting unit includes only one pair of a DC power generating circuit for AC conversion and an alternating power generating circuit for AC conversion, in which the DC power generating circuit for AC conversion converts the supplied AC power into DC power, and the alternating power generating circuit for AC conversion converts DC power which is generated by the DC power generating circuit for AC conversion, into AC power of a predetermined frequency, and wherein the drive system is for a liquid crystal display, and wherein the AC drive device comprises a light emitting member in a backlight of the liquid crystal display and the DC drive device comprises a driver of the liquid crystal display.

14. A drive system that is given AC power from an AC power supply to drive targets to be activated, comprising:

an AC conversion device for acquiring AC power from an AC power supply and converting the supplied AC power into converted AC power having a predetermined frequency and a predetermined voltage;

an AC drive device that is given the converted AC power to be activated;

a DC conversion device for acquiring AC power from an AC power supply and converting the supplied AC power into converted DC power having a predetermined voltage; and a DC drive device that is given the converted DC power to be activated, wherein the AC conversion device has a frequency converting unit for converting a frequency of AC power into a predetermined frequency and a voltage converting unit for converting a voltage of AC power into a predetermined voltage, the frequency converting unit includes only one pair of a DC power generating circuit for AC conversion and an alternating power generating circuit for AC conversion, in which the DC power generating circuit for AC conversion converts the supplied AC power into DC power, and the alternating power generating circuit for AC conversion converts DC power which is generated by the DC power generating circuit for AC conversion, into AC power of a predetermined frequency, and wherein the DC drive device comprises one or more of: a driver of a liquid crystal display, a speaker of a display, and/or an image processing circuit of a liquid crystal display.

15. A drive system that is given AC power from an AC power supply to drive targets to be activated, comprising:

an AC conversion device for acquiring AC power from an AC power supply and converting the supplied AC power into converted AC power having a predetermined frequency and a predetermined voltage;

an AC drive device that is given the converted AC power to be activated;

a DC conversion device for acciuiring AC power from an AC power supply and converting the supplied AC power into converted DC power having a predetermined voltage; and a DC drive device that is given the converted DC power to be activated, wherein the AC conversion device has a frequency converting unit for converting a frequency of AC power into a predetermined frequency and a voltage converting unit for converting a voltage of AC power into a predetermined voltage, the frequency converting unit includes only one pair of a DC power generating circuit for AC conversion and an alternating power generating circuit for AC conversion, in which the DC power generating circuit for AC conversion converts the supplied AC power into DC power, and the alternating power generating circuit for AC conversion converts DC power which is generated by the DC power generating circuit for AC conversion, into AC power of a predetermined frequency, and wherein the DC conversion device and the AC conversion device are arranged in parallel so that AC power from the AC power supply reaches the DC conversion device without first passing through the AC conversion device.

* * * * *